United States Patent
Tsuruga

(10) Patent No.: US 11,630,055 B2
(45) Date of Patent: Apr. 18, 2023

(54) METHOD FOR EVALUATING STRUCTURE USED FOR NUCLIDE TRANSMUTATION REACTION, EVALUATION DEVICE, STRUCTURE MANUFACTURING DEVICE PROVIDED WITH SAME, AND NUCLIDE TRANSMUTATION SYSTEM

(71) Applicant: MITSUBISHI HEAVY INDUSTRIES, LTD., Tokyo (JP)

(72) Inventor: Shigenori Tsuruga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 682 days.

(21) Appl. No.: 16/495,264

(22) PCT Filed: Apr. 3, 2018

(86) PCT No.: PCT/JP2018/014211
§ 371 (c)(1),
(2) Date: Sep. 18, 2019

(87) PCT Pub. No.: WO2018/186378
PCT Pub. Date: Oct. 11, 2018

(65) Prior Publication Data
US 2020/0088629 A1    Mar. 19, 2020

(30) Foreign Application Priority Data

Apr. 3, 2017    (JP) ............... JP2017-073744

(51) Int. Cl.
*G01N 21/21* (2006.01)
*G01N 21/55* (2014.01)
(Continued)

(52) U.S. Cl.
CPC ....... *G01N 21/211* (2013.01); *G01N 21/0303* (2013.01); *G01N 21/55* (2013.01);
(Continued)

(58) Field of Classification Search
CPC ............ G01N 21/211; G01N 21/0303; G01N 21/55; G01N 2021/213; G21G 1/04; G21G 7/00
(Continued)

(56) References Cited

U.S. PATENT DOCUMENTS 6,184,984 B1 * 2/2001 Lee .................... G01J 3/447
356/369
6,323,947 B1 * 11/2001 Freeouf ................ G01N 21/211
250/225

(Continued)

FOREIGN PATENT DOCUMENTS

JP    64-11970 A    1/1989
JP    6-077301 A    3/1994
(Continued)

OTHER PUBLICATIONS

Iwamura, Yasuhiro et al., "Transmutation reactions induced by deuterium permeation through nano-structured palladium multilayer thin film", Current Science, vol. 108, No. 4, pp. 628-632, Feb. 25, 2015.

(Continued)

*Primary Examiner* — Tarifur R Chowdhury
*Assistant Examiner* — Omar H Nixon
(74) *Attorney, Agent, or Firm* — WHDA, LLP

(57) ABSTRACT

A method for evaluating a structure is disclosed, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal, wherein the method includes measuring a change in polar- (Continued)

ization between incident light and reflected light by irradiating the surface layer with light, while holding the structure at a predetermined temperature, and comparing a measurement value of the change in polarization with a threshold of a change in polarization of a structure prepared in advance and evaluating a soundness of the structure based on comparison results.

8 Claims, 12 Drawing Sheets

(51) Int. Cl.
    *G21G 1/04*     (2006.01)
    *G01N 21/03*     (2006.01)
    *G21G 7/00*     (2009.01)

(52) U.S. Cl.
    CPC ................ *G21G 1/04* (2013.01); *G21G 7/00* (2013.01); *G01N 2021/213* (2013.01)

(58) Field of Classification Search
    USPC .......................................................... 356/369
    See application file for complete search history.

(56) References Cited

U.S. PATENT DOCUMENTS

| | | | | |
|---|---|---|---|---|
| 6,804,003 | B1* | 10/2004 | Wang ........................ | G01J 4/02 356/369 |
| 2004/0184035 | A1* | 9/2004 | Li ........................ | G01N 21/211 356/369 |
| 2006/0068513 | A1* | 3/2006 | Funakubo ............ | G01N 21/211 257/E21.01 |
| 2006/0164656 | A1* | 7/2006 | White ................. | G01B 11/0641 356/630 |
| 2012/0269309 | A1* | 10/2012 | Iwamura .................. | G21G 1/04 376/199 |
| 2013/0044847 | A1* | 2/2013 | Steinberg ............... | G21B 3/002 376/151 |
| 2015/0311535 | A1* | 10/2015 | Cohen ..................... | H01M 4/70 420/466 |

FOREIGN PATENT DOCUMENTS

| | | | |
|---|---|---|---|
| JP | 7-012714 A | | 1/1995 |
| JP | 2001-165851 A | | 6/2001 |
| JP | 2004045254 A | * | 2/2004 |
| JP | 2007-077413 A | | 3/2007 |
| JP | 2009-042038 A | | 2/2009 |
| JP | 4346838 B2 | | 10/2009 |
| JP | 2012093303 A | * | 5/2012 |
| JP | 2014-211384 A | | 11/2014 |
| JP | 2016-138807 A | | 8/2016 |

OTHER PUBLICATIONS

International Search Report dated Jul. 3, 2018, issued in counterpart Application No. PCT/JP2018/014211, with English translation (5 pages).

Written Opinon dated Jul. 3, 2018, issued in counterpart Application No. PCT/JP2018/014211, with English translation (14 pages).

* cited by examiner

| | EXTINCTION COEFFICIENT [%]* | REACTION YIELD [μg/cm²/week] |
|---|---|---|
| Pd BASE MATERIAL | 68 | 0 |
| STRUCTURE A | 59 | 0.5 |
| STRUCTURE B | 48 | 3.0 |
| STRUCTURE C | 37 | 4.6 |
| STRUCTURE D | 28 | 5.9 |
| STRUCTURE E | 23 | 4.7 |
| STRUCTURE F | 17 | 3.2 |
| STRUCTURE G | 10 | 0.1 |

*EXTINCTION COEFFICIENT [%] : VALUE OF WAVELENGTH 20 μm

METHOD FOR EVALUATING STRUCTURE USED FOR NUCLIDE TRANSMUTATION REACTION, EVALUATION DEVICE, STRUCTURE MANUFACTURING DEVICE PROVIDED WITH SAME, AND NUCLIDE TRANSMUTATION SYSTEM

TECHNICAL FIELD

The present invention relates to a method for evaluating a structure to be used for nuclide transmutation, an evaluation device, a structure manufacturing device provided with the same, and a nuclide transmutation system.

BACKGROUND ART

An already proposed nuclide transmutation device includes a structure to be used for nuclide transmutation of a multi-layered structure in which calcium oxide (CaO) layers and palladium (Pa) layers are alternately stacked on a palladium base material (for example, refer to Patent Literature 1).

According to the nuclide transmutation device disclosed in Patent Literature 1, nuclide transmutation substances to be subjected to nuclide transmutation are added to the palladium layer provided in the outermost layer of the structure, and the nuclide transmutation substances are transmuted into other elements by causing deuterium to permeate the structure to which the nuclide transmutation substances are added. For example, in the nuclide transmutation device disclosed in Patent Literature 1, cesium ($^{133}$Cs) is nuclide-transmuted into another nuclide, praseodymium ($^{141}$Pr).

In the nuclide transmutation reaction discussed in Patent Literature 1, it is considered that the nuclide transmutation substances to be subjected to nuclide transmutation are incorporated into the crystal lattice of the palladium layer and transmuted into other elements due to many-body reaction by deuterium, lattice structure, metal atom catalysis and the like in the crystal lattice. Therefore, the nuclide transmutation device disclosed in Patent Literature 1 can realize nuclide transmutation reaction with low energy. Conventional nuclear reaction is a two-body reaction that requires an accelerator or the like and causes a high energy deuteron beam to collide with a target, and is different in reaction principle from the nuclide transmutation reaction discussed in Patent Literature 1.

CITATION LIST

Patent Literature

[PTL 1] the Publication of Japanese Patent No. 4346838

SUMMARY OF INVENTION

Technical Problem

In the current technology, it takes several tens to several hundreds of hours for transmutation of an element using the nuclide transmutation device disclosed in Patent Literature 1 (refer to FIGS. 8 to 10 and 12 to 14 of Patent Literature 1). Therefore, if no transmutation occurs until the end of test, the loss of time and cost (material costs of deuterium gas and electric power etc.) is large.

Nonconformity presented on a surface of the structure is considered as a factor that does not cause the transmutation. It may be preferable if the presence of nonconformity on the structure surface (soundness) can be confirmed in advance, but a method for evaluating the structure is not yet established. It is preferable that the soundness of the structure can be evaluated nondestructively.

The present invention has been made in view of such circumstances, and intends to provide an evaluation method and an evaluation device for nondestructively evaluating the soundness of a structure to be used for nuclide transmutation, and further intends to provide a structure manufacturing device provided with the same and a nuclide transmutation system.

Solution to Problem

The present invention provides a method for evaluating a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal, wherein the method includes measuring a change in polarization between incident light and reflected light by irradiating the surface layer with light, while holding the structure at a predetermined temperature, calculating an extinction coefficient based on the change in polarization of the structure, preliminarily setting a threshold of the extinction coefficient based on a relationship between an extinction coefficient of a structure prepared in advance and a reaction yield obtained when the structure prepared in advance is subjected to the nuclide transmutation, and comparing the calculated extinction coefficient with the threshold and evaluating a soundness of the structure based on the comparison results.

By using the change in polarization of light, the soundness of the structure can be evaluated nondestructively. Although the change in polarization is affected by the process temperature, the structure is held at the predetermined temperature according to the above-mentioned invention, so that changes in physical property can be suppressed under the influence of process temperature and accurate measurement can be realized. This makes it possible to confirm whether the structure is nuclide-transmutable before being subjected to the nuclide transmutation reaction.

The change in polarization of light is used, and used is the fact that parameters (reflectance, extinction coefficient, and refractive index) as polarization property differ in the structure before and after transmutation. In at least one parameter of respective parameters (reflectance, extinction coefficient, and refractive index) from the polarization property, the evaluation of the structure is performed using the fact that parameter values are different at a specific wavelength.

A spectroscopic ellipsometer can be used to measure the change in polarization.

The spectroscopic ellipsometer is configured to emit light to a surface of the structure to measure reflected light and can obtain the refractive index, reflectance, and extinction coefficient of the substance limited to the surface. It is also possible to evaluate the conductivity and film thickness of the substance from the measurement results.

In one aspect of the above-mentioned invention, it is desired to irradiate the surface layer with the light at such an incident angle that reflection occurs between a surface of the surface layer and the depth of 10 nm from the surface of the surface layer.

In the low energy nuclide transmutation reaction using a structure having an intermediate layer and a surface layer, it is considered that the transmutation phenomenon occurs in the region from an outer surface of surface layer to the depth of around 10 nm. Accordingly, the structure can be evaluated more accurately by measuring this region.

In one aspect of the present invention, a change in polarization of light on a structure surface (including a certain depth range) is regarded as a change in parameters of reflectance, extinction coefficient, and refractive index, and a device is provided for evaluating a structure by utilizing that parameter values are different at a specific wavelength in at least one parameter.

The present invention provides an evaluation device for a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal, wherein the device includes a structure support means that supports the structure, a temperature holding means that holds a temperature of the structure at a predetermined temperature, and a measurement means that measures a change in polarization between incident light and reflected light by irradiating the surface layer with light.

In one aspect of the above-mentioned invention, the measurement means may be a spectroscopic ellipsometer.

In one aspect of the above-mentioned invention, it is desired that the temperature holding means includes a housing enclosing the structure support means to define a closed space in which the structure is accommodated, a temperature measurement unit that measures the temperature of the structure, and a temperature adjustment unit that adjusts the temperature of the structure.

The present invention provides a device for manufacturing a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal, wherein the measurement means includes the above-described evaluation device installed outside the housing, an exhaust means that is connected to the housing and evaluates the interior of the housing, a target support means that is disposed in the housing and supports a target, a sputtering means that sputters the target, a first optical window provided on a wall surface of the housing in such a way as to guide light emitted from the measurement means to the structure, a second optical window provided on a wall surface of the housing in such a way as to guide reflected light reflected from the structure to the outside of the housing, a first shutter member openably/closably installed inside the housing so as to correspond to the first optical window, and a second shutter member openably/closably installed inside the housing so as to correspond to the second optical window.

According to the above-mentioned invention, manufacturing and evaluation of a structure can be implemented without taking it out from the housing. Providing the first shutter member and the second shutter member can prevent target particles, which are sputtered at the time of film formation for manufacturing of the structure, from adhering to the first optical window and the second optical window.

The present invention provides a nuclide transmutation system including a structure support means that supports a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing Low work function substances relatively lower in work function than the metal and a second layer containing the metal, and a surface layer provided on the intermediate layer and containing the metal, a temperature holding means that holds the temperature of the structure at a predetermined temperature, a measurement means that measures a change in polarization between incident light and reflected light by irradiating the surface layer with light, a reactor in which the structure is disposed and that carries out the nuclide transmutation reaction using the structure and electrodeposition on the structure from which the surface layer has been removed, an inert gas supply means that supplies an inert gas to the reactor, an exhaust means that exhausts an interior of the reactor, an electrodeposition solution supply unit that supplies an electrodeposition solution containing a nuclide transmutation substance and the metal to the reactor, a cleaning water supply unit that supplies cleaning water to the reactor, and an acid solution supply unit that supplies an acid solution to the reactor.

Since the electrodeposition solution absorbs the light from the measurement means, if the electrodeposition solution remains in the reactor, it is difficult to evaluate the physical properties of a surface of the structure by using spectroscopic ellipsometry. However, according to the above-mentioned invention, since the inert gas supply means and the exhaust means are provided, the structure in the reactor can be dried. It becomes possible to perform accurate measurement by irradiating the structure with light after drying.

Advantageous Effects of Invention

The evaluation device and the evaluation method according to the present invention can nondestructively evaluate the soundness of a structure by irradiating the structure with light and measuring a change in polarization of the light. The structure manufacturing device incorporating such an evaluation device and the nuclide transmutation system can efficiency evaluate the manufactured and reproduced structure.

DESCRIPTION OF EMBODIMENTS

The present invention relates to an evaluation method and an evaluation device for nondestructively evaluating the soundness of a structure to be used for nuclide transmutation. In one aspect according to the present invention, a change in polarization between incident light and reflected light is measured by irradiating a surface layer of the structure with light, while holding the structure at a predetermined temperature, a measurement value of the change in polarization is compared with a threshold of a change in polarization of a structure prepared in advance, and a soundness of the structure is evaluated based on comparison results. A spectroscopic ellipsometer is used to measure the change in polarization. It is desired to obtain a value of extinction coefficient based on the change in polarization of the structure.

First, a structure to be evaluated will be described.

Figure 1:
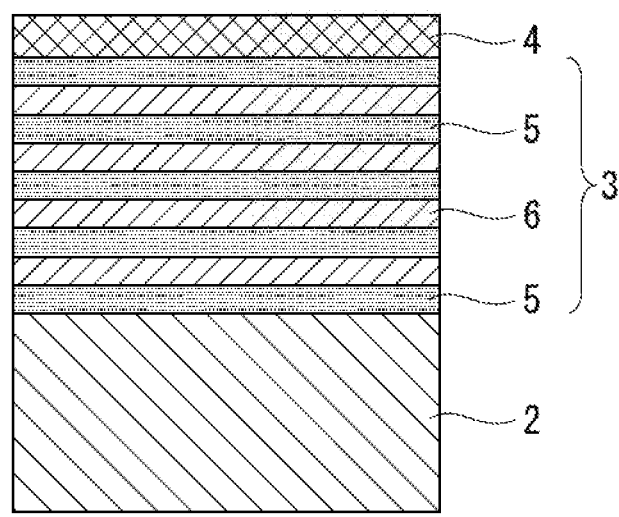
FIG. 1 is a schematic cross-sectional view of a structure to be used for nuclide transmutation reaction.

FIG. 1 is a schematic cross-sectional view of a structure 1 used for nuclide transmutation reaction. The structure 1 includes a base material 2, an intermediate layer 3 stacked on the base material 2, and a surface layer 4 stacked on the intermediate layer 3.

The base material 2 includes at least one kind of metal selected from the group consisting of hydrogen storage metals and hydrogen storage alloys. For example, the metal contained in the base material 2 is palladium (Pd), palladium alloy, nickel, or nickel alloy. The thickness of the substrate is preferably small in view of costs and is, for example, 0.1 mm to 1 mm in consideration of mechanical strength.

The intermediate layer 3 is a mixed layer in which first layers 5 and second layers 6 are alternately stacked.

The first layer 5 contains low work function substances relatively lower in work function than the metal contained in the base material 2. The low work function substances are substances that can easily emit electrons. The work function of low work function substances is 4.2 eV or less. The low work function substances are, for example, calcium oxide (CaO, work function 1.2 eV), yttrium oxide ($Y_2O_3$, work function 2.2 eV), and strontium titanate ($SrTiO_3$, work function 4.2 eV. From the viewpoint of transmutation efficiency, it is preferred to select calcium oxide as the low work function substances.

The second layer 6 contains at least one kind of metal selected from the group consisting of hydrogen storage metals and hydrogen storage alloys. The metal contained in the second layer 6 is the same metal as that contained in the base material 2.

The surface layer 4 contains at least one kind of metal selected from the group consisting of hydrogen storage metals and hydrogen storage alloys. The metal contained in the surface layer 4 is the same metal as that contained in the base material 2. The surface layer A is a layer to which substances to be subjected to nuclide transmutation are added.

The intermediate layer 3 and the surface layer 4 of the structure 1 can be stacked on the base material 2 by sputtering or electrodeposition. In the sputtering, film formation is repeatedly performed to form a layer having a predetermined thickness.

An example of lamination by sputtering is shown below.

The base material 2 (for example, 25 mm long×25 mm wide×0.1 mm thick, purity 99.5% or more) is degreased by ultrasonic cleaning in acetone for a predetermined time. Then, annealing or heating treatment is performed in a vacuum (for example, $1.33 \times 10^{-5}$ Pa or less) at a temperature of, for example, 900° C. for a predetermined time (for example, 10 hours). Next, the annealed base material is etched with heavy aqua regia, for example, at room temperature, for a predetermined time (for example, 100 seconds) to remove impurities from the surface.

After the removal of impurities, the first layers 5 and the second layers 6 are alternately stacked on the etched base material by sputtering using an argon ion beam. For example, in the example illustrated in FIG. 1, the thickness of the first layer 5 is 2 nm and thickness of the second layer 6 is 20 nm, and further the total thickness of the first layers 5 and the second layers 6 (namely, the thickness of the intermediate layer) is 100 nm. In FIG. 1, an uppermost layer of the intermediate layer 3 is the first layer 5. The surface layer 4 is formed on the intermediate layer 3. The thickness of the surface layer 4 is 40 nm. Thus, the structure 1 is formed.

Figure 2:
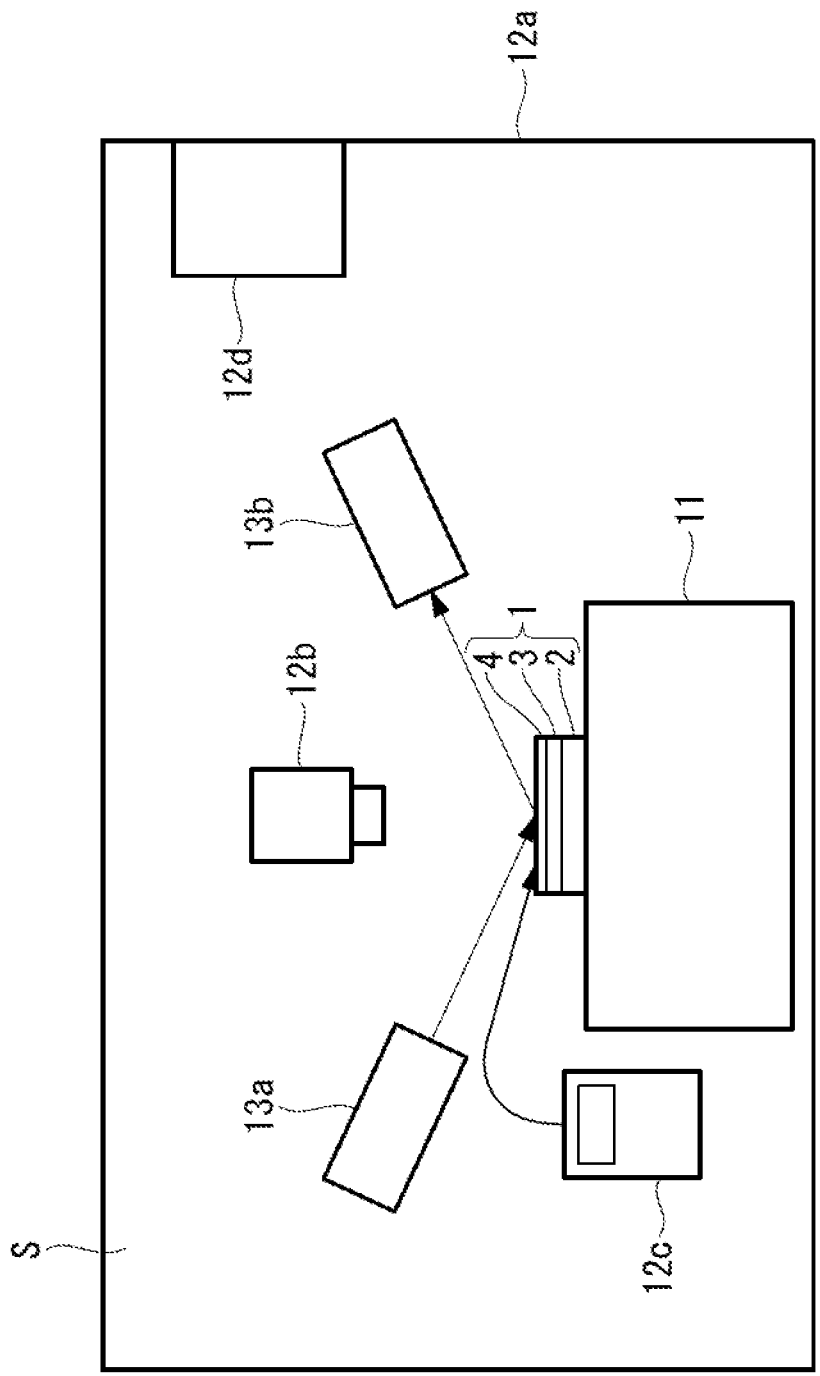
FIG. 2 is a diagram illustrating a schematic configuration of an evaluation device.

Next, an evaluation device for evaluating a structure will be described. FIG. 2 is a diagram illustrating a schematic configuration of an evaluation device 10. The evaluation device 10 includes a structure support means 11, a temperature holding means (12a, 12b, 12c, 12d), and a measurement means (13a, 13b).

The structure support means 11 may have any configuration if it can support the structure 1 at a fixed position with the surface layer 4 being exposed. The structure support means 11 is, for example, a stage for supporting the structure 1 from the base material 2 side, particularly, an XY stage capable of adjusting the positional relationship between the structure 1 and the measurement means (13a, 13b) in both longitudinal and lateral directions, or a hotplate or the like incorporating a temperature controlling machine.

The temperature holding means (12a, 12b, 12c, 12d) is configured to hold the temperature of the structure 1 at a predetermined temperature. In the evaluation device 10 illustrated in FIG. 2, the temperature holding means (12a, 12b, 12c, 12d) is constituted by a housing 12a, a temperature measurement unit (12b, 12c), and a temperature adjustment unit 12d.

The housing 12a encloses the structure support means 11 and defines a closed space S. The structure 1 is accommodated in the closed space S. The housing 12a is, for example, a thermostatic chamber, a space such as a clean room surrounded by heat insulating plates, or the like. The housing 12a includes an opening (not illustrated) through which the structure 1 can enter and exit, and a closing member (not illustrated) that openably/closably or removably closes the opening.

The temperature measurement unit (12*b*, 12*c*) is configured to be able to measure the temperature of the structure 1. The temperature measurement unit (12*b*, 12*c*) is, for example, a radiation thermometer 12*b*, a thermocouple 12*c* or the like. The radiation thermometer 12*b* is disposed to face the surface layer 4 of the structure 1 with a gap. The thermocouple 12*c* is disposed in such a manner that a measurement portion thereof is in contact with an outer surface of the surface layer 4. The radiation thermometer 12*b* and the thermocouple 12*c* can measure the surface side temperature of the surface layer 4. Although FIG. 2 illustrates the arrangement of the radiation thermometer 12*b* and the thermocouple 12*c*, the temperature measurement unit may be either one of them.

The temperature adjustment unit 12*d* is configured to directly or indirectly adjust the temperature of the structure 1. The temperature adjustment unit 12*d* is, for example, an air conditioner or an air conditioning device that combines a heater and a chiller. In FIG. 2, the temperature adjustment unit 12*d* is an air conditioner. The air conditioner is installed on a wall surface of the housing 12*a*. The air conditioner measures the temperature in the closed space S by means of a temperature sensor of its own and circulates a refrigerant into a heat exchanger under the control of a controller to indirectly adjust the temperature of the structure 1. In FIG. 2, temperature adjustment in the closed space S is performed by the temperature sensor provided in the temperature adjustment unit 12*d* of the air conditioner, and the temperature of the structure 1 is confirmed by the radiation thermometer 12*b* and the thermocouple 12*c*.

The temperature adjustment unit 12*d* may include a control unit (not illustrated) that receives a measurement value obtained by the temperature measurement unit (12*b*, 12*c*) and controls the temperature in the closed space S or the structure temperature based on the received measurement value so that the temperature of the structure 1 becomes a predetermined value.

The control unit is, for example, constituted by a central processing unit (CPU), a random access memory (RAM), a read only memory (ROM), and a computer readable storage medium or the like. Sequential processes for realizing various functions are stored in the form of a program, for example, in a storage medium or the like. The CPU reads out this program into the RAM or the like, and executes information processing and calculation processing to realize various functions. The program may be installed in advance in the ROM or other storage medium, may be provided in a state where it is stored in a computer readable storage medium, or may be distributed via a wired or wireless communication means. The computer readable storage medium is a magnetic disk, a light magnetic disk, a CD-ROM, a DVD-ROM, a semiconductor memory or the like.

The measurement means (13*a*, 13*b*) is configured to irradiate the surface layer 4 with light and measure a change in polarization between incident light and reflected light. The measurement means (13*a*, 13*b*) includes a light source 13*a* for emitting light to the structure 1, a detector 13*b* for detecting reflected light reflected from the structure 1, and a calculation unit (not illustrated) configured to calculate a parameter from a change in polarization of the reflected light. For example, the measurement means (13*a*, 13*b*) is a spectroscopic ellipsometer. The parameter includes refractive index n (%), extinction coefficient k (%), or reflectance (%).

Preferably, the light source 13*a* is arranged so as to emit light to the structure 1 at such an angle that the reflection of light occurs between an outer surface of the surface layer 4 of the structure and the depth of 10 nm from the outer surface. The detector 13*b* is disposed at a position where the reflected light can be detected.

In FIG. 2, the measurement means (13*a*, 13*b*) is disposed in the housing 12*a*. However, the measurement means (13*a*, 13*b*) is not limited to this arrangement and may be disposed outside the housing 12*a*. In this case, the wall surface of the housing 12*a* is configured to provide optical windows capable of transmitting incident light and reflected light.

Next, a method for evaluating the structure 1 by the evaluation device 10 described above will be described.

The method includes setting the structure 1 to the structure support means 11. Here, the structure 1 is disposed in the direction in which the surface layer 4 is irradiated with light from the light source 13*a*.

The method further includes closing the closing member to make the inside of the housing 12*a* the closed space S, and causing the temperature holding means (12*a*, 12*b*, 12*c*, 12*d*) to hold the temperature of the structure 1 at the predetermined temperature. The predetermined temperature is, for example, normal temperature (from 15° C. to 25° C.). The predetermined temperature permits a variation of ±0.5° C. By setting the predetermined temperature to the normal temperature, temperature adjustment by the temperature holding means (12*a*, 12*b*, 12*c*, 12*d*) becomes easy.

In FIG. 2, the temperature adjustment unit 12*d* adjusts the temperature of the closed space S to room temperature. The surface temperature of the structure 1 is measured with the radiation thermometer 12*b* and the thermocouple 12*c* to confirm that the predetermined temperature has been reached.

The light source 13*a* emits light to the structure 1, and the detector 13*b* detects the change in polarization of the reflected light. The light is incident at such an angle that light reflection occurs between the surface of the surface layer 4 and the depth of 10 nm from the surface of the surface layer 4. The wavelength of the light is in the wavelength region of and above infrared, more specifically, 0.1 µm to 1000 µm, preferably 1 µm to 20 µm.

Next, the parameter is calculated based on the change in polarization of the reflected light. The parameter is refractive index n (%), extinction coefficient k (%), or reflectance R (%) or the like. Particularly, the parameter is preferably the extinction coefficient k (%). The calculated parameter is compared with a predetermined threshold. The threshold can be set based on the relationship between the preliminarily-obtained change in polarization of the reflected light (parameter) in the structure 1 and nuclide transmutation efficiency in the structure 1 being subjected to the nuclide transmutation reaction. For example, a permissible nuclide transmutation efficiency is determined, and a parameter value of the structure 1 from which the nuclide transmutation efficiency has been obtained is set as the threshold. If the calculated parameter is deviated from the threshold, the structure 1 can be evaluated as being not sound. The threshold may be set in multiple steps, for example, 10 to 55%, preferably 20 to 40%, with respect to extinction coefficient at the wavelength of 20 µm.

Depending on the soundness of the structure, the parameters such as refractive index n (%), extinction coefficient k (%) or reflectance R (%) show significant different values. In at least one parameter of refractive index n (%), extinction coefficient k (%), and reflectance R (%), a parameter value at which the reaction yield becomes high is obtained from a relationship between the reaction yield at a specific wavelength and the parameter value, so that the structure can be evaluated.

For the structure 1 evaluated as being not sound, the surface layer 4 and the intermediate layer 3 may be once removed to newly form the surface layer 4 and the intermediate layer 3 again.

When forming the intermediate layer 3 and the surface layer 4 on the base material 2, in sputtering using an argon ion beam, argon ions are implanted into a target (Pd, CaO, etc.), and a film is formed by causing a material coming out of the target to adhere to a ground layer (the base material 2, the first layer 5 or the second layer 6). When the material flying at high speed adheres to the ground layer, the ground layer is heated.

The physical properties of metals changes largely depending on the temperature. The metal resistance can be expressed by formula (1). Here, T represents temperature (° C.), $T_0$ represents reference temperature (generally, normal temperature), $R_0$ represents electric resistance (Ω) at $T_0$, and α represents change rate of electric resistivity per unit temperature.

$$R(T)=R_0[1+\alpha(T-T_0)] \quad (1)$$

In the spectroscopic ellipsometer, an object is irradiated with light, and the change in polarization of reflected light is measured. The absorption of metal light is mainly due to absorption by free carriers (free electrons). The absorption by free electrons is remarkable especially in the infrared and longer wavelength region. Since the electric conduction of metal depends on free electrons, the resistance change with temperature greatly affects measurement results by the spectroscopic ellipsometer.

In the evaluation device illustrated in FIG. 2, the structure 1 held at the predetermined temperature is irradiated with light, and the change in polarization of reflected light is measured. Thereby, influence by the temperature change of the structure 1 to ellipsometer measurement values can be suppressed, and stable evaluation can be implemented.

Hereinafter, an embodiment of a method for evaluating a structure used in a nuclide transmutation reaction according to the present invention will be described with reference to attached drawings.

First Embodiment

Figure 3:
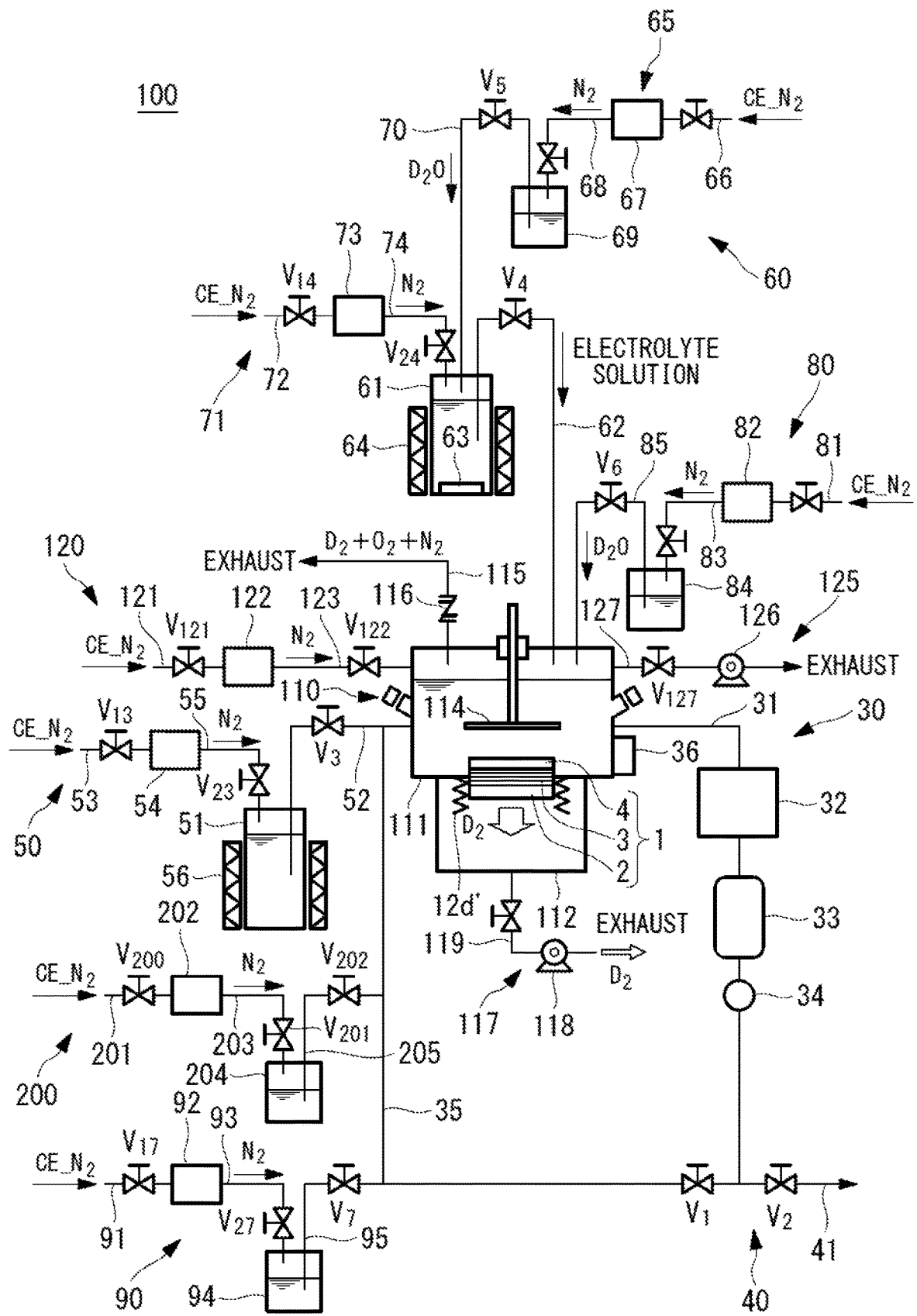
FIG. 3 is a diagram illustrating a schematic configuration of a nuclide transmutation system according to a first embodiment.
Figure 4:
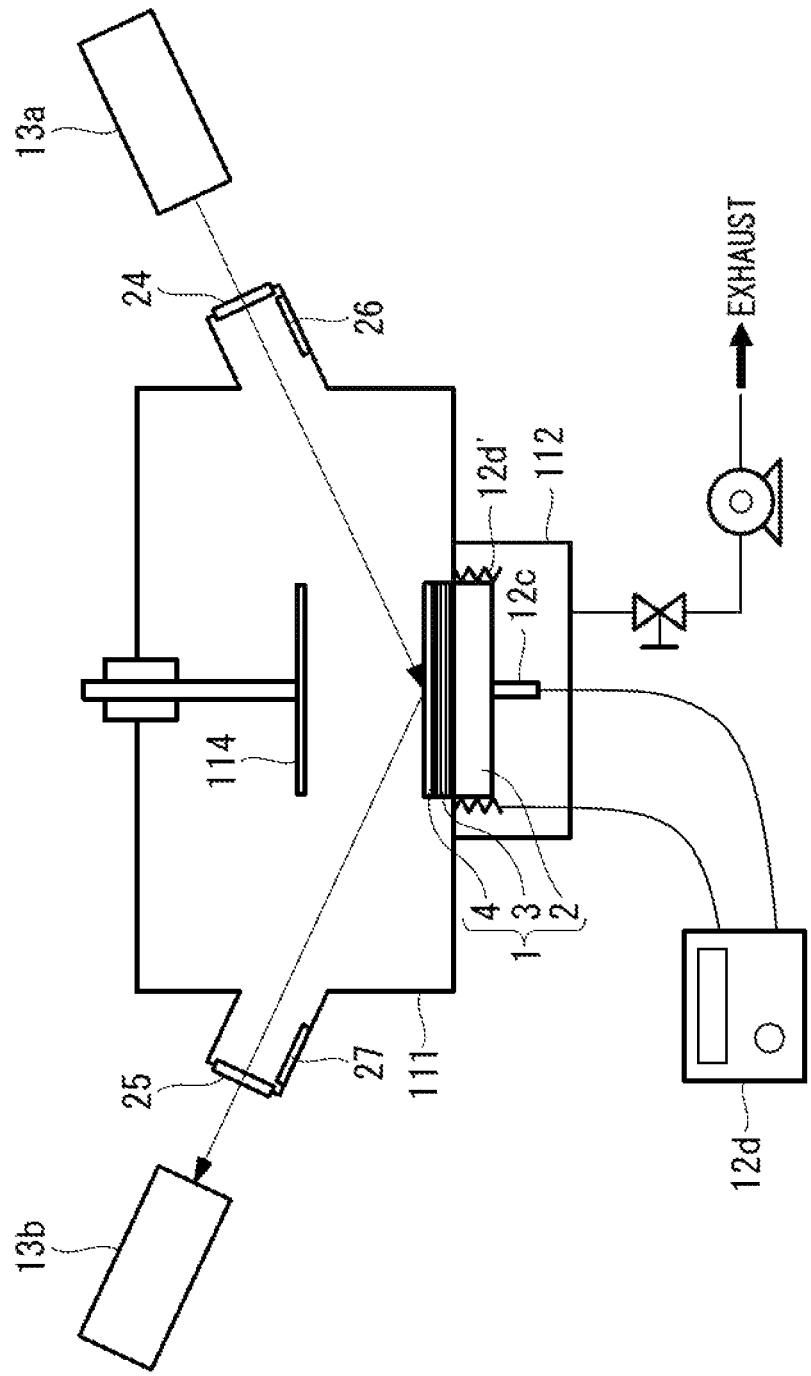
FIG. 4 is a diagram illustrating a schematic configuration of the evaluation device according to the first embodiment.

In the present embodiment, a nuclide transmutation system to which the evaluation device described referring to FIG. 2 is applied will be described. FIG. 3 is a diagram illustrating a schematic configuration of the nuclide transmutation system according to the present embodiment. FIG. 4 is a diagram illustrating a schematic configuration of the evaluation device according to the present embodiment. In FIG. 3, a part of the evaluation device is omitted to simplify the drawing. The omitted part is described in FIG. 4.

A nuclide transmutation system 100 includes a reactor 110 that performs nuclide transmutation reaction.

The reactor 110 includes a reservoir 111 storing an electrolyte solution or the like, a low deuterium concentration section 112, the structure 1 separating the reservoir 111 and the low deuterium concentration section 112, an electrode 114 disposed in the reservoir 111 so as to be apart from and face the structure 1, and an ultrasonic transducer 36.

The structure 1 has the same configuration as that illustrated in FIG. 1. The electrode 114 is a spiral or mesh electrode made of platinum (Pt) or the like. The structure 1 and the electrode 114 are connected to a power source (not illustrated) provided outside the reactor 110.

The ultrasonic transducer 36 is controlled by the control unit (not illustrated) to transmit ultrasonic waves. The ultrasonic transducer 36 is disposed on an outer wall of the reservoir 111 so that ultrasonic waves can be oscillated toward the vicinity of a surface of the structure 1 facing the interior of the reservoir.

An exhaust passage 115 is connected to an upper portion of the reservoir 111. The exhaust passage 115 is provided with a check valve 116. The check valve 116 is closed when the external atmospheric pressure is larger than the atmospheric pressure of a gas stored in the reservoir 111. The check valve 116 is opened when the external atmospheric pressure is smaller than the atmospheric pressure of the gas stored in the reservoir 111 and the gas in the reservoir 111 is discharged to the outside.

A decompression device 117 is connected to the low deuterium concentration section 112. The decompression device 117 includes a vacuum pump 118 such as a turbo molecular pump and a dry pump, and an exhaust pipe 119 for discharging the gas from the low deuterium concentration section 112. The decompression device 117 discharges the gas inside the low deuterium concentration section 112 to reduce the pressure in the low deuterium concentration section 112. A heater 12d' for heating the structure 1 is disposed in the vicinity of the structure 1 in the low deuterium concentration section 112.

A circulation unit 30 for circulating liquid into the reservoir 111 of the reactor 110, an electrolyte solution supply unit 60 for supplying the electrolyte solution to the reactor 110, and a heavy water replenishing unit 80 for replenishing heavy water to the reservoir 111 are connected to the reactor 110.

The circulation unit 30 includes an extraction pipe 31, a heat exchanger 32, a filter 33, a pump 34, a resupply pipe 35, and a valve $V_1$ provided in the resupply pipe 35. The heat exchanger 32 cools the liquid supplied from the extraction pipe 31. The filter 33 filters the liquid supplied from the extraction pipe 31 to remove impurities. The pump 34 supplies the liquid filtered by the filter 33 to the reservoir 111 through the resupply pipe 35.

On the upstream side of the valve $V_1$ of the resupply pipe 35, a discharge unit 40 for discharging the liquid extracted from the reservoir 111 to the outside is provided. The discharge unit 40 includes a discharge pipe 41 for discharging the liquid extracted from the reservoir 111 and a valve $V_2$ provided in the discharge pipe 41.

An electrodeposition solution supply unit 50 for supplying an electrodeposition solution to the reactor 110, a cleaning water supply unit 90 for supplying cleaning water to the reactor 110, an acid solution supply unit 200 for supplying an acid solution to the reactor 110 are connected to the resupply pipe 35.

The electrodeposition solution supply unit 50 includes an electrodeposition solution tank 51 in which the electrodeposition solution is stored, an electrodeposition solution supply pipe 52 connecting the electrodeposition solution tank 51 and the resupply pipe 35, an inert gas supply pipe 53, a dehumidification device 54, a dried inert gas supply pipe 55, and a heater 55 disposed on the outer periphery of the electrodeposition solution tank 51 to heat an electrolyte solution in the electrodeposition solution tank 51 to a predetermined temperature.

The electrodeposition solution stored in the electrodeposition solution tank 51 contains salts of hydrogen storage metals such as palladium, and nuclide transmutation substances to be subjected to nuclide transmutation, salts of the nuclide transmutation substances, radioactive substances including $^{137}$Cs or the like. The nuclide transmutation substances are, for example, Cs, Sr, Na, and Ba. The electrodeposition solution supply pipe 52 is provided with a valve $V_3$ for controlling the flow rate of the electrodeposition solution.

The inert gas supply pipe 53 connects a gas source (not illustrated) and the dehumidification device 54. The inert gas supply pipe 53 supplies an inert gas, such as CE (Cold Evaporator)_$N_2$ and argon (Ar), supplied from the gas source.

The dehumidification device 54 includes a filter with a dehumidification function, such as silica gel. The dehumidification device 54 removes impurities from the inert gas supplied from the inert gas supply pipe 53 and dries the inert gas. The dried inert gas supply pipe 55 connects the dehumidification device 54 and the electrodeposition solution tank 51. The dried inert gas supply pipe 55 supplies the inert gas dried by the dehumidification device 54 to the electrodeposition solution tank 51. Thus, the electrodeposition solution is fed to the reservoir 111 of the reactor 110 through the electrodeposition solution supply pipe 52.

The cleaning water supply unit 90 includes an inert gas supply pipe 91, a dehumidification device 92, a dried inert gas supply pipe 93, a cleaning water tank 94 for storing cleaning water therein, and a cleaning water supply pipe 95.

The inert gas supply pipe 91 connects the gas source (not illustrated) and the dehumidification device 92. The dried inert gas supply pipe 93 connects the dehumidification device 92 and the cleaning water tank 94. The cleaning water supply pipe 95 connects the cleaning water tank 94 and the resupply pipe 35. The cleaning water supply pipe 95 is provided with a valve $V_7$ for adjusting the flow rate of the cleaning water. Heavy water and pure water can be used as the cleaning water. The pure water is not particularly limited if it can remove acid components from the surface of the base material 2. As the pure water, for example, distilled water, ion exchanged water, and ultrapure water can be used. Ultrapure water is preferable from the viewpoint of the efficiency in removing the acid components from the base material 2.

In the cleaning water supply unit 90, the inert gas supplied from the gas source (not illustrated) is supplied to the cleaning water tank 94 through the inert gas supply pipe 91, the dehumidification device 32, and the dried inert gas supply pipe 93. Thereby, the interior of the cleaning water tank 94 is pressurized, and the cleaning water is supplied to the reservoir 111 through the cleaning water supply pipe 95.

The acid solution supply unit 200 includes an inert gas supply pipe 201, a dehumidification device 202, a dried inert gas supply pipe 203, an acid solution tank 204 for storing the acid solution therein, and an acid solution supply pipe 205.

The inert gas supply pipe 201 connects the gas source (not illustrated) and the dehumidification device 202. The dried inert gas supply pipe 203 connects the dehumidification device 202 and the acid solution tank 204. The acid solution supply pipe 205 connects the acid solution tank 204 and the resupply pipe 35. The acid solution supply pipe 205 is provided with a valve $V_{202}$ for adjustment the flow rate of the acid solution.

At least one kind of liquid selected from the group consisting of heavy water and nitric acid, aqua regia and hydrofluoric acid can be used as the acid solution. The nitric acid is not particularly limited if it can dissolve and remove the surface layer 4, the first layer 5, and the second layer 6. As the nitric acid, for example, commercially available 8% nitric acid, 35% nitric acid, 60% nitric acid (specific gravity 1.38), 90% nitric acid, 0.1 mol/L nitric acid, 1 mol/L nitric acid or the like can be used.

In the acid solution supply unit 200, the inert gas supplied from the gas source (not illustrated) is supplied to the acid solution tank 204 through the inert gas supply pipe 201, the dehumidification device 202, and the dried inert gas supply pipe 203. As a result, the interior of the acid solution tank 204 is pressurized, and the acid solution is supplied to the reservoir 111 through the acid solution supply pipe 205.

The electrolyte solution supply unit 60 includes an electrolyte solution tank 61, an electrolyte solution supply pipe 62, a heavy water supply unit 65, and an inert gas supply unit 71.

The heavy water supply unit 65 includes an inert gas supply pipe 66, a dehumidification device 67, a dried inert gas supply pipe 68, a heavy water tank 69 for storing the heavy water therein, and a heavy water supply pipe 70.

The inert gas supply pipe 66 connects the gas source (not illustrated) and the dehumidification device 67. The dried inert gas supply pipe 68 connects the dehumidification device 67 and the heavy water tank 69. The heavy water supply pipe 70 connects the heavy water tank 69 and the electrolyte solution tank 61.

In the electrolyte solution supply unit 60, the inert gas supplied from the gas source (not illustrated) is supplied to the heavy water tank 69 through the inert gas supply pipe 66, the dehumidification device 67, and the dried inert gas supply pipe 68. As a result, the heavy water tank 69 is pressurized, and the heavy water is supplied to the electrolyte solution tank 61 through the heavy water supply pipe 70. The amount of heavy water to be supplied is controlled by a valve $V_5$ provided in the heavy water supply pipe 70.

The inert gas supply unit 71 includes an inert gas supply pipe 72, a dehumidification device 73, and a dried inert gas supply pipe 74.

The inert gas supply pipe 72 connects the gas source (not illustrated) and the dehumidification device 73. The dried inert gas supply pipe 74 connects the dehumidification device 73 and the electrolyte solution tank 61.

The inert gas supply unit 71 supplies the inert gas supplied from the gas source (not illustrated) to the electrolyte solution tank 61 through the dried inert gas supply pipe 74. Thereby, the interior of the electrolyte solution tank 61 is pressurized.

An electrolyte salt 63 is disposed at a bottom part of the electrolyte solution tank 61. The electrolyte salt 63 is not particularly limited, and for example, an electrolyte salt containing the same elements as the above-described nuclide transmutation substances such as cesium nitrate ($CsNO_3$), cesium hydroxide (CsOH), sodium nitrate ($NaNO_3$), and strontium nitrate ($SrNO_3$) can be used. The electrolyte salt 63 is dissolved by being immersed in heavy water to form an electrolyte solution.

A heater 64 for heating the electrolyte solution in the electrolyte solution tank 61 to a predetermined temperature is disposed at an outer periphery portion of the electrolyte solution tank 61. The electrolyte concentration of the electrolyte solution can be adjusted by controlling the temperature of the electrolyte solution and the amount of heavy water supplied from the heavy water supply unit 65. The concentration of the electrolyte solution is, for example, a concentration between 0.001 mol/l and a saturated concentration.

The electrolyte solution supply pipe 62 connects the electrolyte solution tank 61 and the reservoir 111 of the reactor 110. By pressuring the interior of the electrolyte solution tank 61, the electrolyte solution is supplied to the reservoir 111 through the electrolyte solution supply pipe 62. The amount of electrolyte solution to be supplied is controlled by a valve $V_4$ provided in the electrolyte solution supply pipe 62.

The heavy water replenishing unit 80 includes an inert gas supply pipe 81, a dehumidification device 82, a dried inert gas supply pipe 83, a heavy water tank 84 for storing heavy water therein, and a heavy water replenishing pipe 85.

The inert gas supply pipe 81 connects the gas source (not illustrated) and the dehumidification device 82. The dried inert gas supply pipe 83 connects the dehumidification device 82 and the heavy water tank 84. The heavy water replenishing pipe 85 connects the heavy water tank 84 and the reservoir 111.

In the heavy water replenishing unit 80, the inert gas supplied from the gas source (not illustrated) is supplied to the heavy water tank 84 through the inert gas supply pipe 81, the dehumidification device 82, and the dried inert gas supply pipe 83. As a result, the interior of the heavy water tank 34 is pressurized, and the heavy water is supplied to the reservoir 111 through the heavy water replenishing pipe 85. The amount of heavy water to be supplied is controlled by a valve $V_6$ provided in the heavy water replenishing pipe 85.

The nuclide transmutation system 100 further includes a configuration corresponding to the evaluation device 10 illustrated in FIG. 2.

The structure 1 is supported by outer walls of the reservoir 111 and the low deuterium concentration section 112 (which corresponds to the structure support means). The outer walls of the reservoir 111 and the low deuterium concentration section 112 further correspond to the housing 12a of the evaluation device 10. The temperature of the structure 1 can be measured by the thermocouple 12c and can be held at a predetermined temperature with the heater 12d of the temperature adjustment unit 12d.

A first optical window 24 and a second optical window 25 are provided on side walls of the reservoir 111. The first optical window 24 is installed in such a way as to guide light emitted from the light source 13a, which is installed outside the reservoir 111, to a surface of the structure in the reservoir 111. The second optical window 25 is installed in such a way as to guide reflected light reflected on the surface of the structure 1 to the detector 13b installed outside the reservoir 111. The material of the first optical window 24 and the second optical window 25 is quartz or the like.

A first shutter member 26 and a second shutter member 27 are provided on side walls of the reservoir 111. The first shutter member 26 and the second shutter member 27 are disposed inside the reservoir 111 so as to correspond to the first optical window 24 and the second optical window 25, respectively. Each of the first shutter member 26 and the second shutter member 27 includes an opening/closing means (not illustrated) that can be opened and closed from the outside. The opening/closing nay be performed manually or automatically by the control unit. FIG. 4 illustrates a state where the first shutter member 26 and the second shutter member 27 are opened.

An inert, gas supply means 120 and an exhaust means 125 are connected to the reservoir 111.

The inert gas supply means 120 includes an inert gas supply pipe 121, a dehumidification device 122, and a dried inert gas supply pipe 123.

The inert gas supply pipe 121 connects the gas source (not illustrated) and the dehumidification device 122. The dried inert gas supply pipe 123 connects the dehumidification device 122 and the reservoir 111. It may be desirable that the dried inert gas supply pipe 123 is connected in such a way as to spray the gas to the structure surface in the reservoir 111. The inert gas supply pipe 121 is provided with a valve $V_{121}$. The dried inert gas supply pipe 123 is provided with a valve $V_{123}$.

The inert gas supply means 120 supplies the inert gas, such as CE (Cold Evaporator)_$N_2$ and argon (Ar), supplied from the gas source (not illustrated) to the reservoir 111 through the dried inert gas supply pipe 123. The dehumidification device 122 includes a filter with a dehumidification function, such as silica gel. The dehumidification device 122 removes impurities from the inert gas supplied from the inert gas supply pipe 121 and dries the inert gas.

The exhaust means 125 includes a pump 126 and an exhaust pipe 127 for discharging the gas from the reservoir 111. The exhaust pipe 127 connects the reservoir 111 and a decompression pump.

Next, operations of the above-described nuclide transmutation system 100 will be described. The nuclide transmutation system 100 can perform nuclide transmutation reaction, reproduction of the structure, and evaluation of the structure.

Nuclide Transmutation Reaction

In the nuclide transmutation system 100, the nuclide transmutation reaction is performed through an electrolyte solution supply process, a nuclide transmutation process, and an electrolyte solution cooling process.

In the electrolyte solution supply process, first, the electrolyte solution supply unit 60 generates an electrolyte solution in which the electrolyte is dissolved in heavy water, and supplies the generated electrolyte solution to the reservoir 111 of the reactor 110. That is, the inert gas supply pipe 66 supplies a nitrogen gas from the gas source at a predetermined flow rate to the dehumidification device 67. The dehumidification device 67 removes impurities from the nitrogen gas and dries the nitrogen gas. The heavy water tank 69 is pressurized by supplying the nitrogen gas. The heavy water supply pipe 70 supplies the heavy water from the heavy water tank 69 at a predetermined flow rate to the electrolyte solution tank 61.

By dissolving the electrolyte in the heavy water supplied to the electrolyte solution tank 61, the electrolyte salt 63 produces an electrolyte solution of a predetermined concentration in the electrolyte solution tank 61. The heater 64 heats the electrolyte solution to a predetermined temperature.

The inert gas supply pipe 72 supplies a nitrogen gas at a predetermined flow rate to the dehumidification device 73. The dehumidification device 73 removes impurities from the nitrogen gas and dries the nitrogen gas. The electrolyte solution tank 61 is pressurized by supplying the nitrogen gas. The electrolyte solution supply pipe 62 supplies the electrolyte solution from the electrolyte solution tank 61 at a predetermined flow rate to the reservoir 111 of the reactor 110.

The inert gas supply pipe 81 supplies the nitrogen gas at a predetermined flow rate to the dehumidification device 82. The dehumidification device 82 removes impurities from the nitrogen gas and dries the nitrogen gas. The heavy water tank 84 is pressurized by supplying the nitrogen gas. The heavy water replenishing pipe 85 supplies the heavy water from the heavy water tank 84 at a predetermined flow rate to the reservoir 111 of the reactor 110.

The nuclide transmutation process is performed when the electrolyte solution is stored in the reservoir 111 of the reactor 110. The voltage generation device applies a predetermined voltage (2 V or more) to the electrode 114 for the structure 1. The electrolyte solution stored in the reservoir 111 is electrolyzed by applying the predetermined voltage to the structure 1. On a surface of the structure 1 where the intermediate layer 3 and the surface layer 4 are formed, the electrolyte solution is electrolyzed, and nuclides of substances contained in the electrolyte solution are collected in the intermediate layer 3 and the surface layer 4 of the structure 1, causing a deuterium gas $D_2$.

The heater 12d' heats a portion of the structure 1 on the side of the low deuterium concentration section 112 so that the structure 1 has a predetermined temperature.

The pump 118 of the decompression device 117 discharges the filling gas from the low deuterium concentration section 112 to set the atmospheric pressure in the low deuterium concentration section 112 to be less than 0.1 Pa. Decompression of the low deuterium concentration section 112 reduces the concentration of the deuterium D. In the structure 1, when the concentration at which the low deuterium concentration section 112 is filled with the deuterium is reduced, a concentration gradient of the deuterium occurs in the thickness direction of the structure 1, which causes the deuterium to permeate from the reservoir 111 to the low deuterium concentration section 112. The structure 1 generates heat in the vicinity of the intermediate layer 3 and the surface layer 4 by the implementation of the nuclide transmutation process described above.

The nuclides are collected in the intermediate layer 3 and the surface layer A of the structure 1 and constitute nuclide transmutation substances to be subjected to nuclide transmutation. The nuclides are subjected to the nuclide transmutation when the deuterium permeates the structure 1. For example, cesium $^{133}Cs$ is nuclide-transmuted into praseodymium $^{141}Pr$. Strontium $^{88}Sr$ is nuclide-transmuted into molybdenum $^{96}Mo$, and $^{138}Ba$ is nuclide-transmuted into $^{150}Sm$.

The electrolyte solution cooling process is performed in parallel with the nuclide transmutation process, in the electrolyte solution cooling process, the circulation unit 30 cools the electrolyte solution. That is, after the reaction, the electrolyte solution extraction pipe 31 extracts the electrolyte solution stored in the reservoir 111 of the reactor 110. The heat exchanger 32 cools the electrolyte solution so that the electrolyte solution extracted from the reservoir 111 of the reactor 110 has a predetermined temperature. The filter 33 filters the electrolyte solution cooled by the heat exchanger 32 to remove impurities from the electrolyte solution. The pump 34 pressurizes the electrolyte solution filtered by the filter 33, and supplies the pressurized electrolyte solution to the reservoir 111 of the reactor 110 through the resupply pipe 35 of the cooled electrolyte solution.

According to the electrolyte solution cooling process, the electrolyte solution cooled by the circulation unit 30 flows in the reservoir 111 of the reactor 110 and appropriately contacts the surface of the surface layer 4 of the structure 1. The structure 1 is appropriately cooled by the cooled electrolyte solution contacting the surface of the surface layer 4 of the structure 1.

Reproduction of Structure

The structure 1 is placed in the reactor 110, and then, in the electrodeposition solution supply unit 50, a valve $V_{13}$ of the inert gas supply pipe 53, a valve $V_{23}$ of the dried inert gas supply pipe 55, and the valve $V_3$ of the electrodeposition solution supply pipe 52 are opened. As a result, the electrodeposition solution in the electrodeposition solution tank 51 is supplied to the reservoir 111 through the electrodeposition solution supply pipe 52 and the resupply pipe 35. When a predetermined amount of electrodeposition solution is stored in the reservoir 111, the valves $V_1$, $V_3$, $V_{13}$ and $V_{23}$ are closed and the pump 34 is stopped. Subsequently, the voltage of the power source is applied to the electrode 114. This forms an electrodeposition layer in which the hydrogen storage metals such as palladium in the electrodeposition solution are electrodeposited on the surface of the structure 1 together with the nuclide transmutation substances.

Next, the electrodeposition solution in the reservoir 111 is discharged to the outside through the extraction pipe 31 and the discharge unit 40 by opening the valve $V_2$ and activating the pump 34, and then any electrodeposition solution remaining in the reservoir 111 or the like may be washed away if necessary.

Next, in the electrolyte solution supply unit 60, a valve $V_{14}$ of the inert gas supply pipe 72, a valve $V_{24}$ of the dried inert gas supply pipe 74, and the valve $V_4$ of the electrolyte solution supply pipe 62 are opened. As a result, the electrolyte solution in the electrolyte solution tank 61 is supplied to the reservoir 111 through the electrolyte solution supply pipe 62, and the electrolyte solution supplied to the reservoir 111 is adjusted to a predetermined temperature (for example, not less than 20° C. and not higher than 40° C.) by the heat exchanger 32 while the electrolyte solution is circulated into the circulation unit 30.

Next, the interior of the low deuterium concentration section 112 is decompressed by the decompression device 117, and the structure 1 is heated to a predetermined temperature (for example, 70° C.) by the heater 12d'.

Next, by applying the voltage of the power source to the electrode 114, the heavy water ($D_2O$) is electrolyzed on the surface of the structure 1 to generate deuterium ($D_2$). As a result, the generated deuterium permeates through the structure 1 and flows toward the low deuterium concentration section 112. Therefore, in the electrodeposition layer of the structure 1, various transmutation reactions advance to transmute nuclide transmutation substances (e.g., Cs) into substances to be transmuted (e.g., Pr) for other elements. Here, if necessary, the electrolyte solution and the heavy water are supplied from the electrolyte solution supply unit 60 and the heavy water replenishing unit 80 to the reservoir 111, and the heavy water is supplied from the heavy water supply unit 65 to the electrolyte solution tank 61.

Next, the power source stops applying the voltage to the electrode 114, and then the electrolyte solution is discharged via the discharge unit 40. Next, in the acid solution supply unit 200, a valve $V_{200}$ of the inert gas supply pipe 201, a valve $V_{201}$ of the dried inert gas supply pipe 203, and the valve $V_{202}$ of the acid solution supply pipe 205 are opened. As a result, the acid solution in the acid solution tank 204 is supplied to the reservoir 111 through the acid solution supply pipe 205 and the resupply pipe 35. When a predetermined amount of acid solution is stored in the reservoir 111, the valves $V_{200}$, $V_{201}$, and $V_{202}$ are closed.

By driving the pump 34 to circulate the acid solution in the reservoir 111 through the resupply pipe 35, the surface layer 4 of the structure 1 is dissolved together with the substances to be transmuted. This makes it possible to collect the nuclide transmutation substances having been subjected to the nuclide transmutation by the structure 1.

Next, the electrolyte solution containing the eluted components in the reservoir 111 is discharged via the discharge unit 40, and then, in the cleaning water supply unit 90, the valve $V_{17}$ of the inert gas supply pipe 91, the valve $V_{27}$ of the dried inert gas supply pipe 93, and the valve $V_7$ of the cleaning water supply pipe 95 are opened. Thereby, the cleaning water in the cleaning water tank 94 is supplied to the reservoir 111 through the cleaning water supply pipe 95 and the resupply pipe 35. When a predetermined amount of cleaning water is stored in the reservoir 111, the valves $V_{17}$, $V_{27}$, and $V_7$ are closed.

Circulating the cleaning water in the reservoir 111 through the resupply pipe 35 by driving the pump 34 can clean the surface of the structure 1 from which the surface layer 4 has been removed. Next, the cleaning water in the reservoir 111 is discharged via the discharge unit 40, and then an electrodeposition solution is supplied again from the electrodeposition solution supply unit 50 to provide a surface layer 4 containing nuclide transmutation substances on the surface of the structure 1 from which the surface layer 4 has been removed, thereby enabling reproduction of the structure 1.

In the present embodiment, an electrodeposition layer containing nuclide transmutation substances is provided by electrodeposition on the surface of the structure 1 provided in the reservoir 111 to perform nuclide transmutation, and the surface layer 4 of the structure 1 containing substances to be transmuted after the nuclide transmutation reaction is dissolved and removed by the acid solution supplied from the acid solution supply unit 200 into the reservoir 111.

After the surface of the structure 1 from which the surface layer 4 has been dissolved and removed is cleaned by the cleaning water supplied from the cleaning water supply unit 90 into the reservoir 111, an electrodeposition solution is supplied again from the electrodeposition solution supply unit 50 to provide a surface layer 4 containing nuclide transmutation substances on the surface of the structure 1. Thus, the nuclide transmutation system 100 can continuously transmute nuclide transmutation substances into substances to be transmuted and collect them without removing the structure 1 from the reactor 110.

Evaluation of Structure

After the structure 1 is reproduced, the valve $V_1$ of the resupply pipe 35 is closed and the valve $V_2$ provided in the discharge pipe 41 is opened, and further the pump 34 is activated to discharge the liquid in the reservoir 111 to the outside. After the discharging, the pump 34 is stopped and the valve $V_2$ is closed.

The valves $V_{121}$, $V_{122}$ and $V_{127}$ are opened to supply an inert gas into the reservoir 111, and the pump 126 is activated. Supplying the inert gas into the reservoir 111 can dry and remove water (such as cleaning liquid) remaining on the surface of the structure. As the inert gas, CE_$N_2$ used for the extraction of the cleaning liquid or the electrolyte solution can be diverted. In addition, evacuating the interior of the reservoir 111 using the pump 126 and bringing the periphery of the structure 1 into a decompressed state can promote the evaporation of water.

Further, it may be useful to heat the structure 1 by the heater 12$d'$. Thereby, the evaporation of water can be promoted.

After drying the structure 1, evaluation of the structure 1 is performed in the same manner as in the first embodiment. The end of drying can be determined, for example, by the pressure value of the pump 126. The pressure at the end of drying is set in advance by a preliminary test or the like.

In the structure 1 that has undergone the reproduction process using the electrodeposition solution or the like, the liquid remains on the surface, when the structure 1 with the wet surface is subjected to the ellipsometer, the residual liquid adversely affects the absorption or reflection of light and accordingly accurate structure surface information cannot be acquired. However, according to the present embodiment, the structure 1 can be measured with the ellipsometer after drying.

Structure evaluation results according to the above-described embodiment are as follows.

Spectroscopic Ellipsometer Measurement Test

Measurement of a Pd base material and a plurality of structures A to G was performed using a spectroscopic ellipsometer (infrared multi-incident image spectroscopic ellipsometer IR-VASE manufactured by J. A. Woollam Co. Inc.).

The Pd base material is a plate made of Pd (25 mm*25 mm×0.1 mm). After purchase, only acetone-based cleaning was performed, and the base material before etching with aqua regia was subjected to the meter.

Structure A was obtained by etching the above-described Pd base material with aqua regia and forming an intermediate layer (first layer: CaO, 2 nm/second layer: Pd, 20 nm) and a surface layer (Pd, 40 nm) on the base material. Structures A to G are similar in configuration to that of FIG. 1. Formation of structures A to G was performed under the same conditions.

Measurement conditions are as follows.

Wavelength range: 1.7 μm to 30 μm (333 $cm^{-1}$ to 5880 $cm^{-1}$)

Beam diameter: approximately 6 mm

Incident angle: 60 degrees, 70 degrees

Measurement time: approximately 60 minutes (one incident angle)

It is also possible to evaluate the distribution on the structure plane by moving the position where the beam is emitted for measurement.

Figure 5:
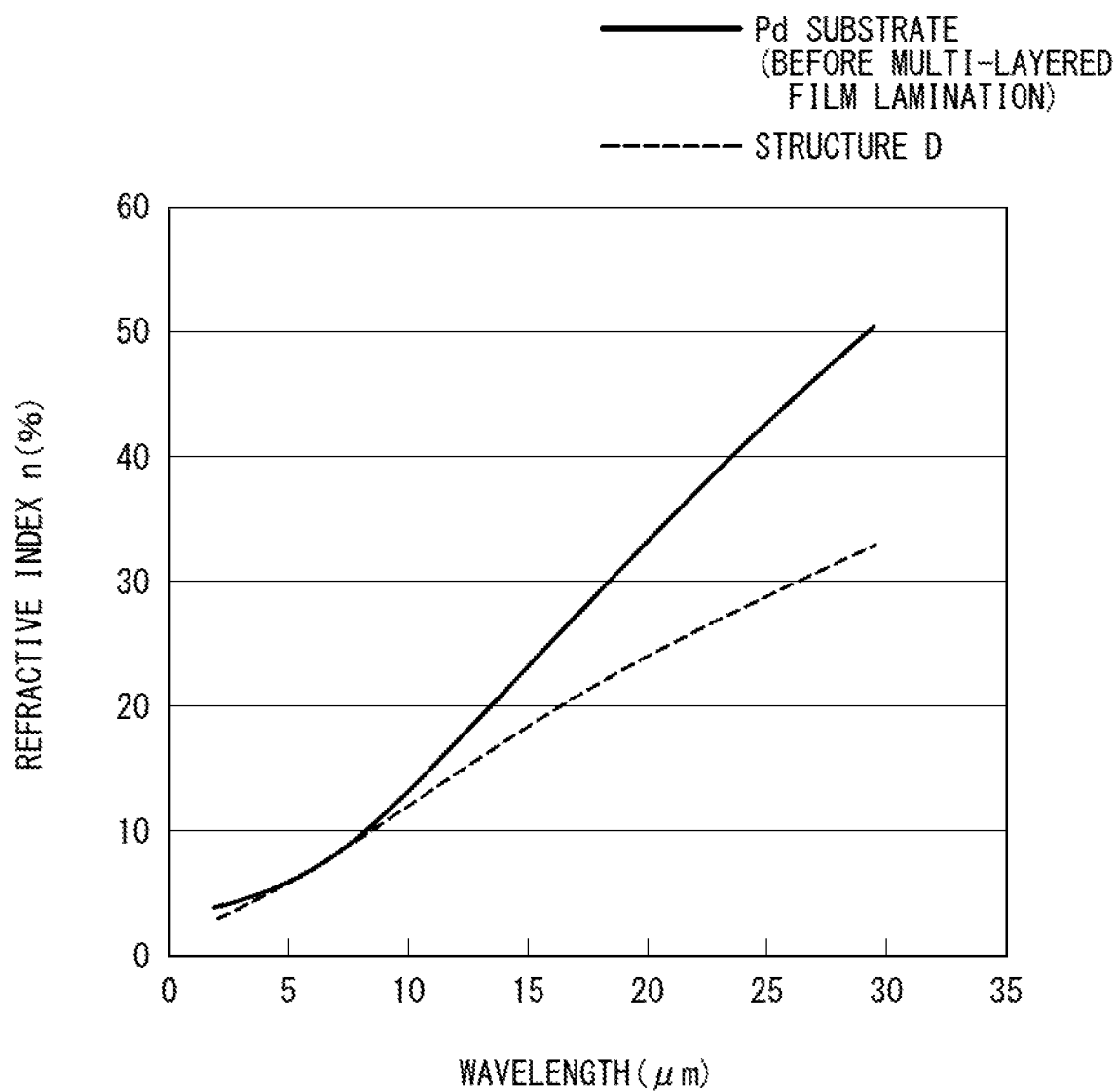
FIG. 5 is a diagram exemplarily illustrating ellipsometry measurement results.
Figure 6:
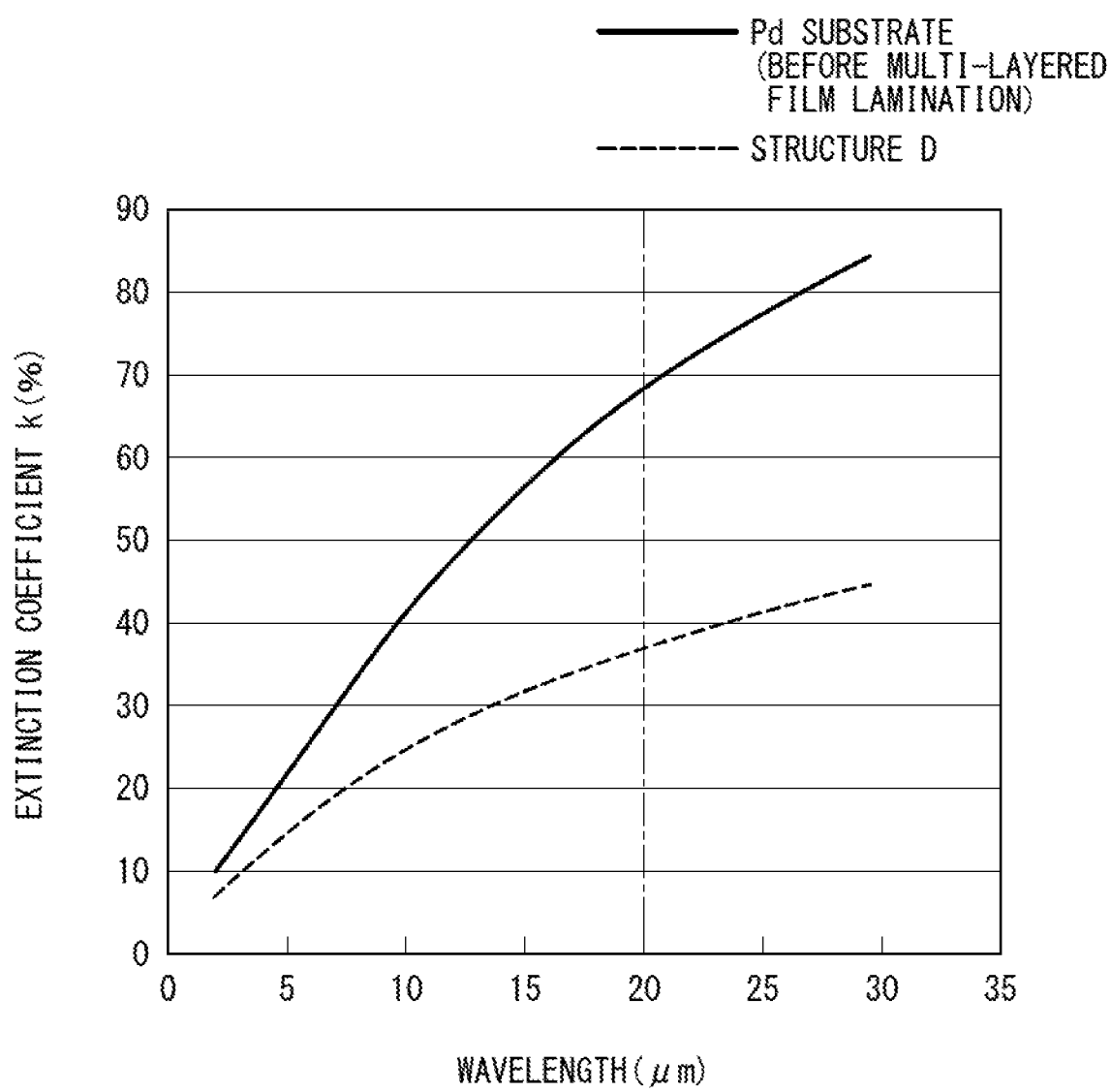
FIG. 6 is a diagram exemplarily illustrating ellipsometry measurement results.
Figure 7:
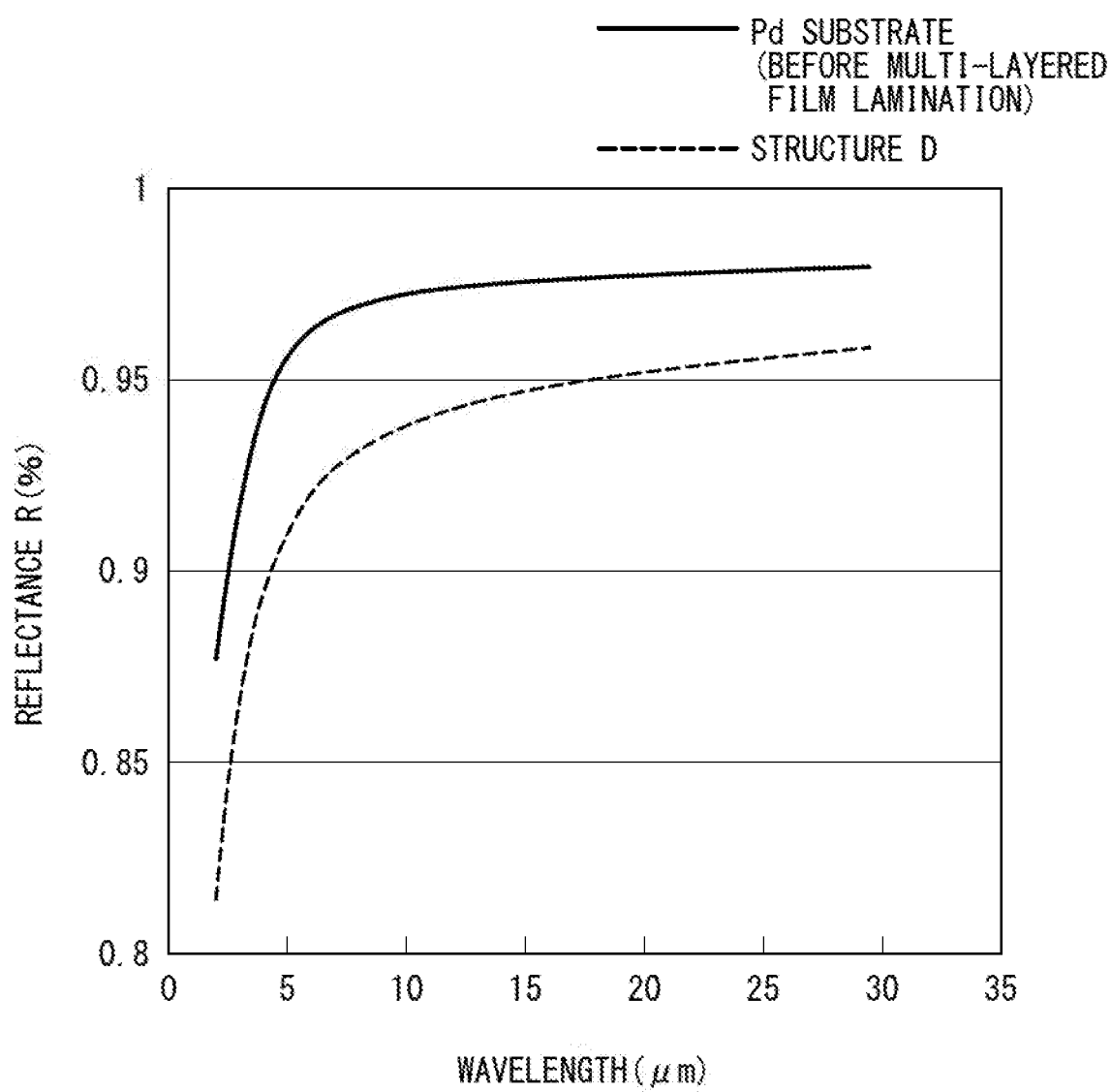
FIG. 7 is a diagram exemplarily illustrating ellipsometry measurement results.

FIGS. 5 to 7 exemplarily illustrate ellipsometry measurement results of the Pd base material and structure D. In FIG. 5, the horizontal axis represents wavelength (μm), and the vertical axis represents refractive index n (%) calculated from the change in polarization of the reflected light. In FIG. 6, the horizontal axis represents wavelength (μm), and the vertical axis represents extinction coefficient k (%) calculated from the change in polarization of the reflected light. In FIG. 7, the horizontal axis represents wavelength (μm), and the vertical axis represents reflectance R (%) calculated from the change in polarization of the reflected light.

Both of the Pd base material and the outermost layer of structure D were layers of Pd. However, according to FIGS. 5 to 7, differences were found between the Pd base material and structure D in the values of parameters (refractive index, extinction coefficient, and reflectance). The differences are based on the influence of heat input at the time of film formation, or on different crystal structures due to the deposition using a CaO layer as the ground in the structure.

Nuclide Transmutation Reaction Test

The above-described Pd base material and structures A to G were subjected to the nuclide transmutation device illustrated in FIG. 3, and a nuclide transmutation reaction test was performed according to the above-described embodiment. During the nuclide transmutation reaction, the valve $V_3$, the valve $V_{202}$, the valve $V_7$, the valve $V_{122}$, and the valve $V_{127}$ were kept in the closed state.

The electrolyte contained in the electrolyte salt 63 used for the nuclide transmutation was cesium nitrate $CsNO_3$. The electrolyte solution supplied into the reservoir space of the reactor 110 was cesium nitrate $CsNO_3$ (1 mol/L) and the liquid volume was 100 mL.

The preset temperature of the heat exchanger 32 was 25° C. The cooling capacity of the heat exchanger 32 was 140 W. With the heat exchanger 32, an electrolyte solution at 25° C. was supplied into the reservoir space of the reactor 110 at the flow rate of 100 mL/min. The electrolyte solution was electrolyzed for 150 hours while the electrolyte solution was circulated into the reactor 110 and the heat exchanger 32. A DC electric field of 2 V to 30 V was applied between the electrode 114 and the structure 1 to electrolyze the electrolyte solution. Deuterium generated at the surface of the structure by electrolysis permeates the structure and is evacuated by the vacuum pump 118. Further, a part of generated deuterium gas and an oxygen gas generated at the electrode 114 are evacuated through the exhaust passage 115. After the electrolyte solution was electrolyzed for 150 hours, the structure was taken out from the reactor 110, and a solution was obtained as an analysis sample by dissolving the surface of the taken-out structure with nitric acid. This analysis sample was analyzed by ICP-MS (Inductively Coupled Plasma Mass Spectrometry) to measure the amount of production of praseodymium $^{141}Pr$ from cesium $^{133}Cs$ on the surface of the surface layer 4 of the structure.

Figure 8:
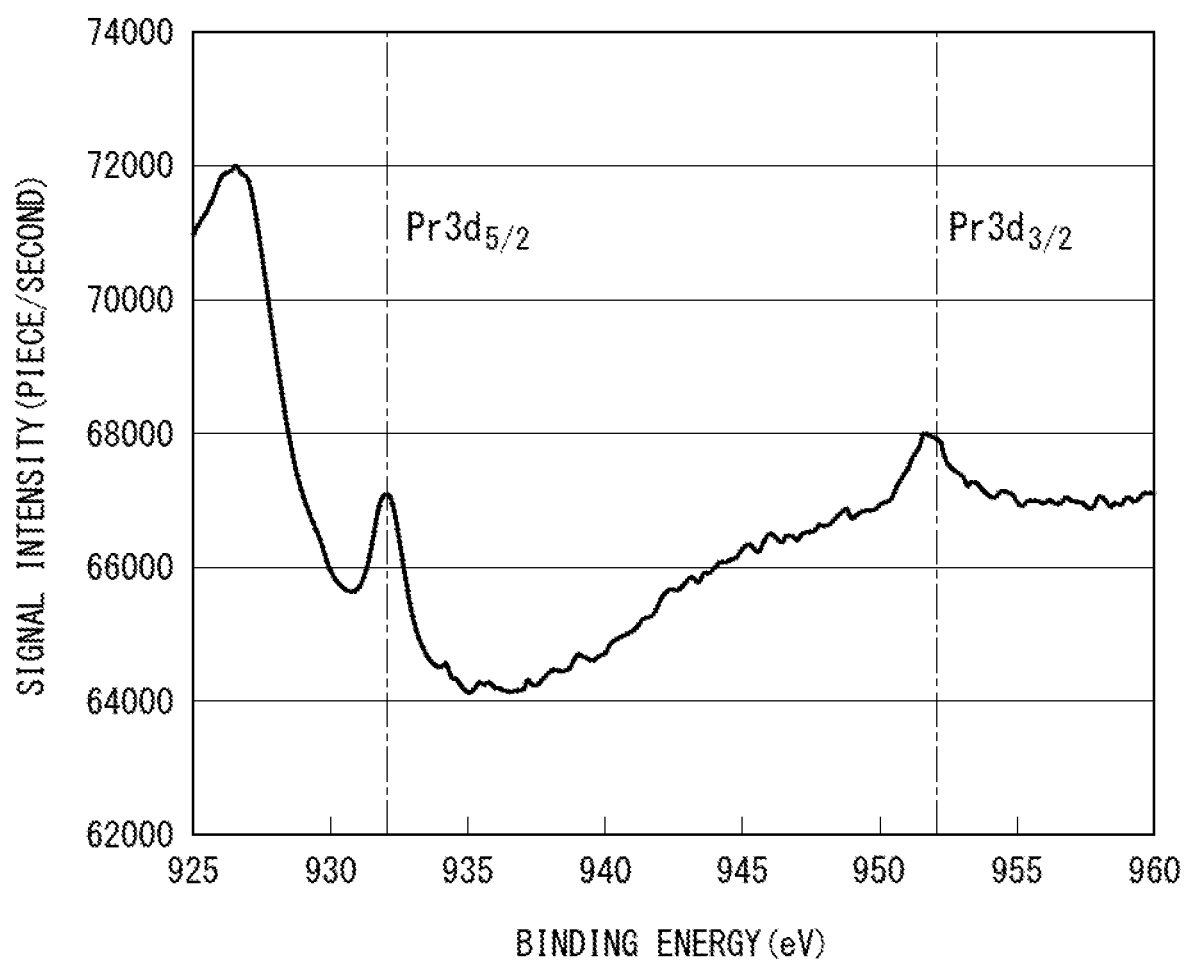
FIG. 8 is a diagram illustrating XPS analysis results after transmutation of $^{133}$Cs.

FIG. 8 illustrates results of XPS (X-ray photoelectron spectroscopy) analysis after transmutation of $^{133}Cs$. In this drawing, the horizontal axis represents binding energy (eV), and the vertical axis represents signal intensity (piece/second). According to FIG. 8, peaks were observed at binding energy 932 eV and binding energy 952 eV corresponding to $3d_{5/2}$ and $3d_{3/2}$ of Pr, respectively.

Figure 9:
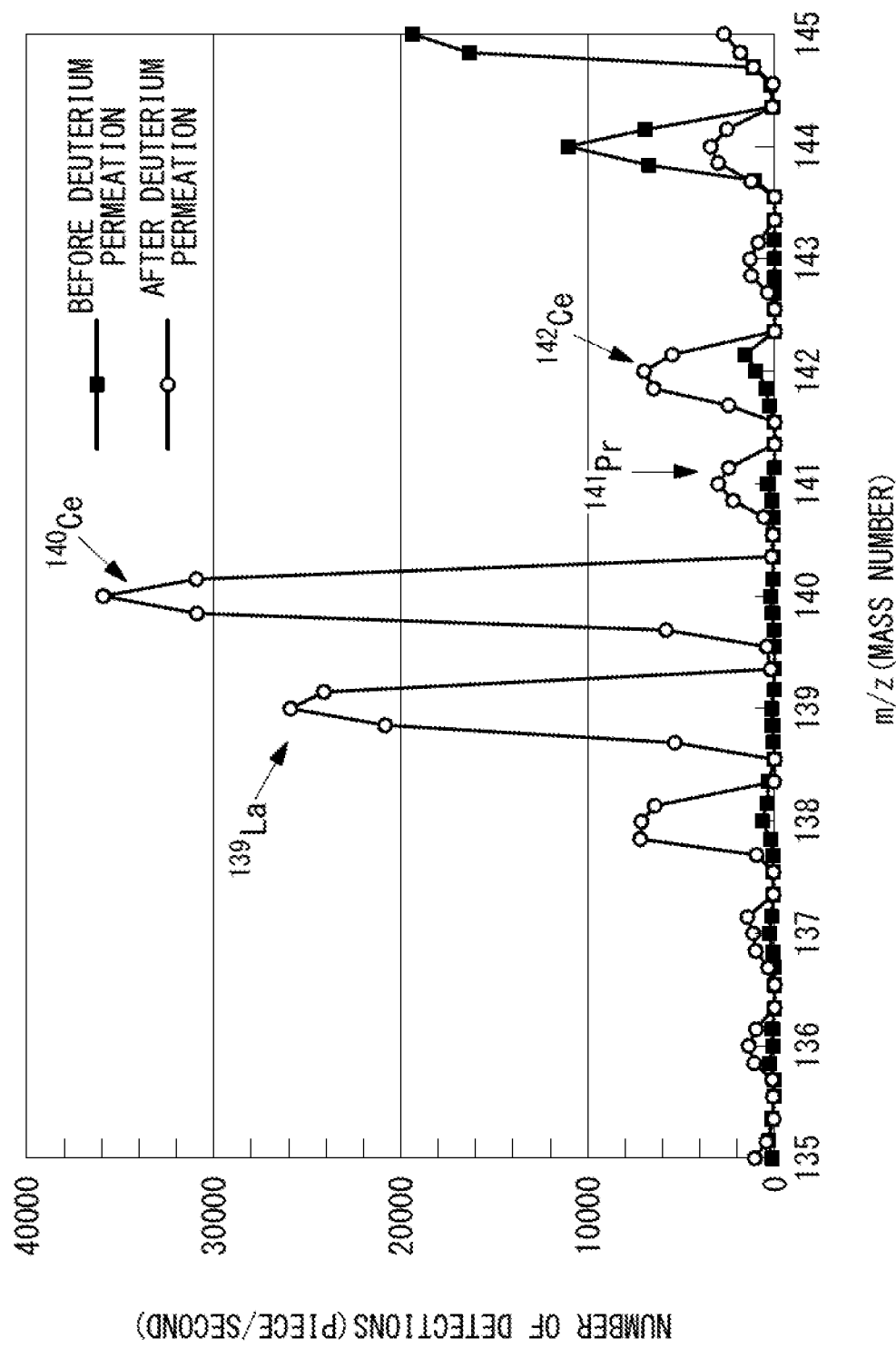
FIG. 9 is a diagram illustrating ICP-MS analysis results after transmutation of $^{133}$Cs.

FIG. 9 illustrates results of ICP-MS (Inductively Coupled Plasma Mass Spectrometry) analysis. In this drawing, the horizontal axis represents mass number (m/z), and the vertical axis represents the number of detections (piece/second). In FIG. 9, a peak was observed at m/z 141, which is the mass number of Pr, in the structure after deuterium permeation.

Figures 10, 11:
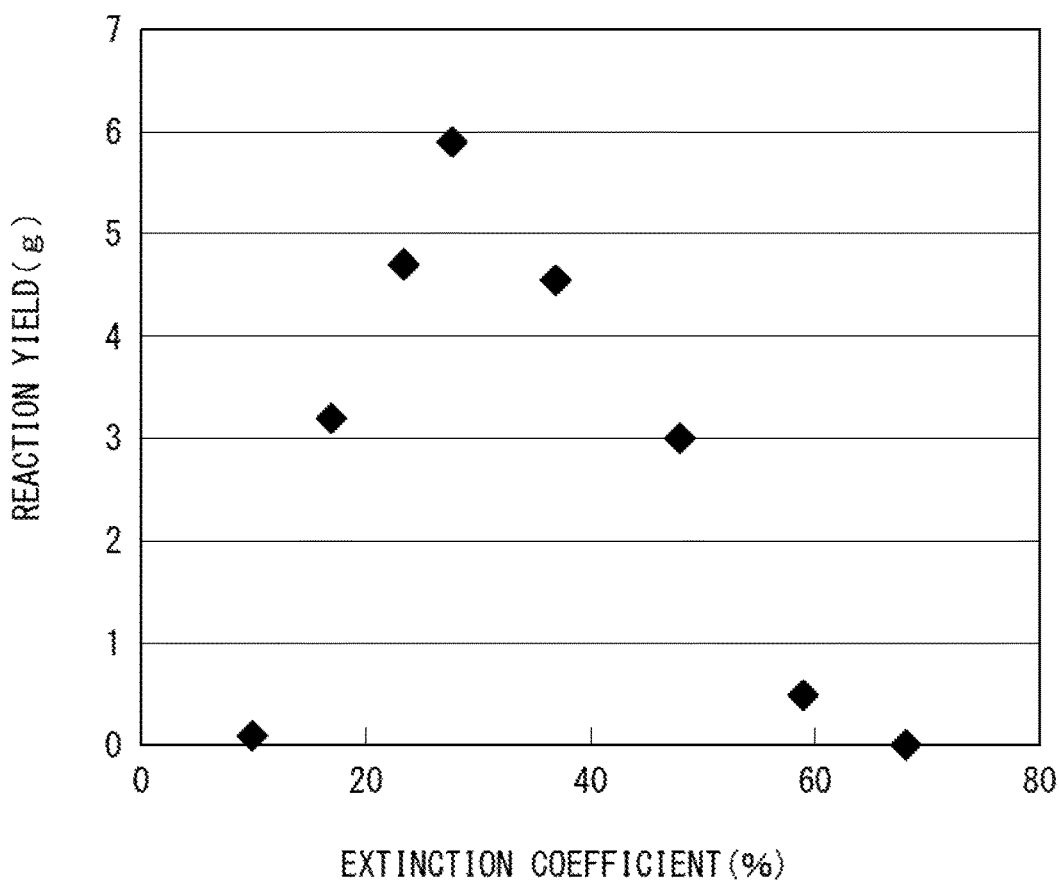
FIG. 10 is a diagram illustrating results of a spectroscopic ellipsometer measurement test and a nuclide reaction test.
FIG. 11 is a diagram illustrating results of the spectroscopic ellipsometer measurement test and the nuclide reaction test.

FIGS. 10 and 11 illustrate results of the spectroscopic ellipsometer measurement test and a nuclide reaction test. FIG. 10 is a table indicating extinction coefficient at the value of a wavelength 20 µm calculated by the spectroscopic ellipsometer and reaction yield (the amount of production) obtained by the ICP-MS measurement. FIG. 11 is a graph plotting the results of FIG. 10. In FIG. 11, the horizontal axis represents extinction coefficient (%), and the vertical axis represents reaction yield (g).

According to FIGS. 10 and 11, the Pd base material had an extinction coefficient of 68% and no praseodymium $^{141}Pr$ was detected. On the other hand, formation of praseodymium $^{141}Pr$ was confirmed in all of structures A to G. Thereby, it was suggested that the occurrence of the nuclide transmutation reaction was based on the inclusion of the intermediate layer and the surface layer.

According to FIGS. 10 and 11, it was suggested that there is a difference in reaction yield between structures being different in extinction coefficient at the wavelength 20 µm even if the nuclide transmutation reaction processes are under the same conditions. The nuclide transmutation reaction was confirmed if the extinction coefficient at the wavelength 20 µm is not less than 10% and not greater than 59%. The structure being not less than 17% and not greater than 48% in the extinction coefficient at the wavelength 20 µm had an increase in reaction yield by an order of magnitude.

From the above results, it was suggested that the structure to be used for nuclide transmutation could be evaluated by associating the parameter obtained from the measurement results by the spectroscopic ellipsometer with the nuclide transmutation efficiency in performing the nuclide transmutation reaction using the evaluated structure and by setting the threshold. In this manner, evaluating the extinction coefficient of the structure before being subjected to the transmutation reaction can roughly estimate the reaction yield after transmutation. Therefore, if it is possible to include the ellipsometry measurement means keeping the temperature of the structure constant and constituted by a light source and a detector, then it is possible to evaluate the structure at various test stages. Further, it becomes possible to prevent the test execution using a structure that is insufficient in reaction yield. An example is the following second embodiment.

Second Embodiment

Figure 12:
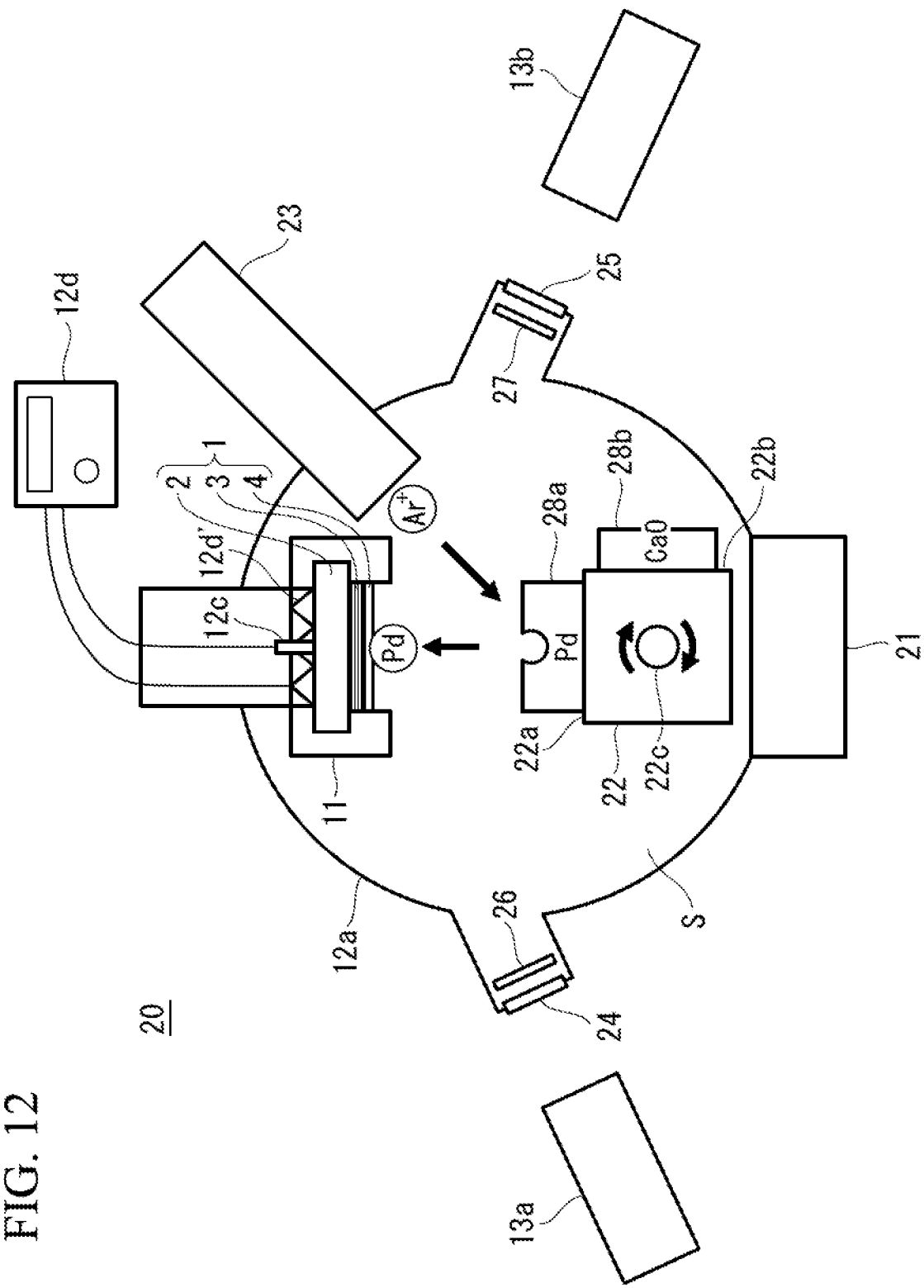
FIG. 12 is a diagram illustrating a schematic configuration of a structure manufacturing device (at the time of film formation) according to a second embodiment.
Figure 13:
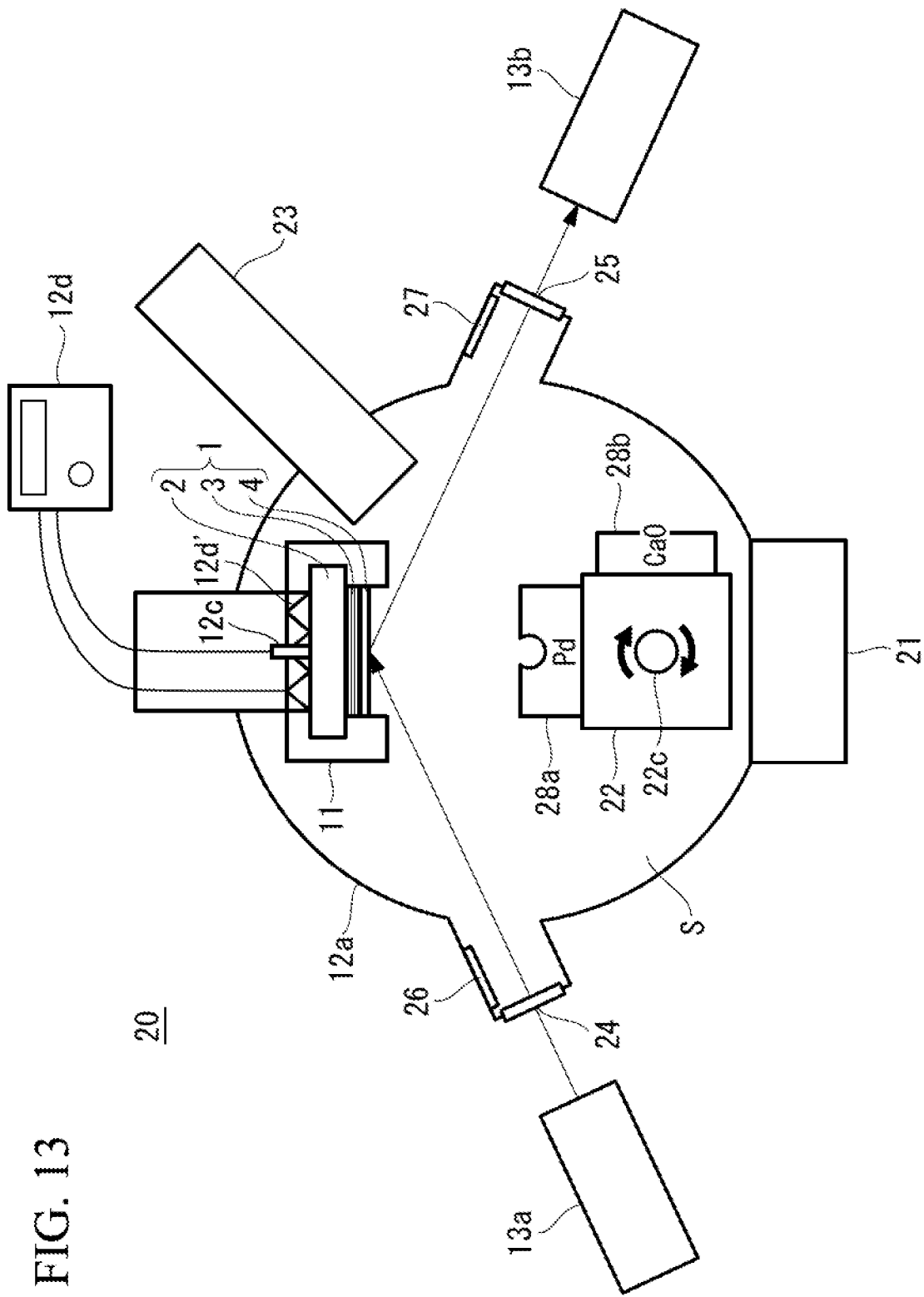
FIG. 13 is a diagram illustrating a schematic configuration of a structure manufacturing device (at the time of evaluation) according to the second embodiment.

In the present embodiment, a structure manufacturing device and a structure manufacturing method to which the above-mentioned evaluation device 10 is applied will be described. FIGS. 12 and 13 are diagrams illustrating schematic configurations of a manufacturing device 20 for the structure 1 according to the present embodiment. FIG. 12 is a diagram schematically illustrating the device at the time of film formation. FIG. 13 is a diagram schematically illustrating the device at the time of evaluation. In FIGS. 12 and 13, configurations that exert functions common to those in FIGS. 1 and 2 are denoted by the same reference numerals.

The manufacturing device 20 for the structure 1 includes an evaluation device, an exhaust means 21, a target support means 22, a sputtering means 23, a first optical window 24, a second optical window 25, a first shutter member 26, and a second shutter member 27.

The evaluation device includes a structure support means 11, a temperature holding means (12a, 12d), and a measurement means (13a, 13b).

The structure support means 11 supports a substrate side and a side surface of the structure 1. The temperature holding means (12a, 12d) includes a housing 12a, a temperature measurement unit 12c and a temperature adjustment unit 12d, 12d'. The measurement means (13a, 13b) is installed outside the housing 12a.

The housing 12a encloses the structure support means 11 and defines a closed space S. The housing 12a is a vacuum chamber. The vacuum chamber includes the exhaust means 21 such as a turbo molecular pump having a configuration capable of holding a vacuum degree of $5*10^{-5}$ Pa. The housing 12a includes an opening through which the structure 1 can be inserted and removed and a closing member (not illustrated) for closing the opening.

A first optical window 24 and a second optical window 25 are provided on wall surfaces of the housing 12a. The first optical window 24 is installed in such a way as to guide light emitted from a light source 13a installed outside to a surface of the structure 1 in the housing 12a. The second optical window 25 is installed in such a way as to guide reflected light reflected on the surface of the structure 1 to a detector 13b installed outside. The material of the first optical window 24 and the second optical window 25 is quartz or the like.

The first shutter member 26 and the second shutter member 27 are provided on wall surfaces of the housing 12a. The first shutter member 26 and the second shutter member 27 are disposed on inner walls of the housing 12a so as to correspond to the first optical window 24 and the second optical window 25, respectively. Each of the first shutter member 26 and the second shutter member 27 includes an opening/closing means (not illustrated) that can be opened and closed from the outside. The opening/closing may be performed manually or automatically by the control unit (not illustrated).

A temperature adjustment unit (a heater 12d' and a controller 12d) is connected to the structure support means 11. The heater 12d' directly adjusts the temperature of the structure 1 from the substrate side based on the temperature measured by the temperature measurement unit 12c and can hold the structure 1 at a predetermined temperature.

The exhaust means 21 for evacuating the interior of the housing 12a and the sputtering means 23 for sputtering a target are connected to the housing 12a. The exhaust means 21 is a vacuum pump or the like. The sputtering means 23 may have any configuration if it can cause gas ions to collide with a target (23a, 28b) so that sputtering occurs. The sputtering means 23 illustrated in FIGS. 12 and 13 is an argon ion gun.

The target support means 22 for supporting the target (28a, 28b) is disposed in the housing 12a. The target support means 22 illustrated in FIGS. 12 and 13 has two target support portions (22a, 22b). The target 28a for the first layer is supported by the first target support portion 22a. The target 28b for the second layer and for the surface layer is supported by the second target support portion 22b. The target support means 22 includes a rotation mechanism 22c so that the target where the sputtering occurs can be switched.

Next, a method for manufacturing the structure 1 by the above-described manufacturing device 20 will be described. The method for manufacturing the structure 1 according to the present embodiment includes a film formation process and an evaluation process.

Film Formation Process

This process includes setting the base material 2 in the structure support means 11, and includes setting the target 28a for the first layer and the target 28b for the second layer in the target support means 22. The process further includes directing the target 28a for the first layer in the target support means 22 to the base material 2 side, and bringing the first shutter member 26 and the second shutter member 27 into the closed state (see FIG. 12).

The process further includes evacuating the interior of the housing 12a, and holding the temperature of the structure 1 at a predetermined temperature for the film formation with the heater 12d'. The predetermined temperature for the film formation is, for example, 100° C. to 200° C.

The process further includes causing argon ions to collide with the target 28a for the first layer so that sputtering occurs for film formation, thereby forming the first layer 5, and subsequently, rotating the target support means 22 to direct the target 28b for the second layer to the base material 2 side. The process further includes causing argon ions to collide with the target 28b for the second layer so that sputtering occurs for film formation, thereby forming the second layer 6. The formation of the first layer 5 and the formation of the second layer 6 are alternately performed to form the intermediate layer 3.

The process further includes rotating the target support means 22 to direct the target for the surface layer (identical to the target 28a for second layer) to the base material 2 side, after forming the first layer 5 as the uppermost layer of the intermediate layer 3, and then causing argon ions to collide with the target for the surface layer so that sputtering occurs, thereby forcing the surface layer 4 on the intermediate layer 3.

Evaluation Process

This process includes opening the first shutter member 26 and the second shutter member 27 (see FIG. 13) after completing the formation of the surface layer 4.

The process further includes adjusting the structure 1 to have a predetermined temperature with the heater 12d', measuring the surface temperature of the structure 1, and confirming that the predetermined temperature has been reached.

The process further includes irradiating the structure 1 with light from the light source 13a, and detecting the change in polarization of the reflected light with the detector 13b. Incident light and reflected light travel between the structure 1 and the measurement means (13a, 13b) via the first optical window 24 and the second optical window 25. Like the description referring to FIG. 2 and the first embodiment, the evaluation of the structure is performed.

According to the present embodiment, since film formation and evaluation for manufacturing a structure can be implemented as sequential operations in a single device, the work efficiency is high. Further, using the heater 12d' not only as a heating means for film formation but also as a temperature holding means for evaluation is effective to save costs and installation location. In the case of using the vacuum chamber not only for sputtering but also as the housing 12a partly constituting the temperature holding means, sputtered substances adhere to the first optical window 24 and the second optical window 25 during film formation, which worsens the transmission of light. However, according to the present embodiment, since the first shutter member 26 and the second shutter member 27 are closed during film formation, the first optical window 24 and the second optical window 25 can be covered so as to prevent the adhesion of sputtered substances.

REFERENCE SIGNS LIST 1 structure
2 base material
3 intermediate layer
4 surface layer
5 first layer
6 second layer
10 evaluation device
11 structure support means
12a housing (a part of temperature holding means)
12b radiation thermometer (a part of temperature measurement unit)
12c thermocouple (a part of temperature measurement unit)
12d air conditioning controller (temperature adjustment unit)
12d' heater (temperature adjustment unit)
13a light source (a part of measurement means)
13b detector (a part of measurement means)
20 structure manufacturing device
21 exhaust means
22 target support means
22a, 22b target support portion
22c rotation means
23 sputtering means
24 first optical window 25 second optical window
26 first shutter member
27 second shutter member
28a, 28b target
30 circulation unit
31 extraction pipe
32 heat exchanger
33 filter
34 pump
35 resupply pipe
36 ultrasonic transducer
40 discharge unit
41 discharge pipe
50 electrodeposition solution supply unit
51 electrodeposition solution tank
52 electrodeposition solution supply pipe
53, 66, 72, 81, 91, 121, 201 inert gas supply pipe
54, 67, 73, 82, 92, 122, 202 dehumidification device
55, 68, 74, 83, 93, 123, 203 dried inert gas supply pipe
56 heater
60 electrolyte solution supply unit
61 electrolyte solution tank
62 electrolyte solution supply pipe
63 electrolyte salt
64 heater
65 heavy water supply unit
69, 84 heavy water tank
70 heavy water supply pipe
71 inert gas supply unit
80 heavy water replenishing unit
85 heavy water replenishing pipe
90 cleaning water supply unit
94 cleaning water tank
95 cleaning water supply pipe
100 nuclide transmutation system
110 reactor
111 reservoir
112 low deuterium concentration section
114 electrode
115 exhaust passage
116 check valve
117 decompression device
118 vacuum pump
119, 127 exhaust pipe
120 inert gas supply means
125 exhaust means
126 decompression pump
200 acid solution supply unit
204 acid solution tank
205 acid solution supply pipe

The invention claimed is:

1. A method for evaluating a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal, wherein the method comprises:
measuring a change in polarization between incident light and reflected light by irradiating the surface layer with light, while holding the structure at a predetermined temperature;
calculating an extinction coefficient based on the change in polarization of the structure,
preliminarily setting a threshold of the extinction coefficient based on a relationship between an extinction coefficient of a structure prepared in advance and a reaction yield obtained when the structure prepared in advance is subjected to the nuclide transmutation reaction; and
comparing the calculated extinction coefficient with the threshold and subject the structure to nuclide transmutation reaction when the extinction coefficient meets the threshold, and remove the surface layer when the extinction coefficient does not meet the threshold;
wherein a spectroscopic ellipsometer is used to measure the changes in polarization.

2. The method for evaluating a structure to be used for nuclide transmutation reaction according to claim 1, wherein the surface layer is irradiated with the light at such an incident angle that reflection occurs between a surface of the surface layer and the depth of 10 nm from the surface of the surface layer.

3. The method for evaluating a structure according to claim 1, wherein the threshold of the extinction coefficient at a light wavelength of 20 μm is set in a range not less than 17% and not greater than 48%.

4. An evaluation device for a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal, wherein the device comprises:
a structure support means that supports the structure;
a temperature holding means that holds the temperature of the structure at a predetermined temperature; and
a measurement means that measures a change in polarization between incident light and reflected light by irradiating the surface layer with light,
wherein the device is configured to
calculate an extinction coefficient based on the change in polarization of the structure measured by the measurement means,
preliminarily set a threshold of the extinction coefficient based on a relationship between an extinction coefficient of a structure prepared in advance and a reaction yield obtained when the structure prepared in advance is subjected to the nuclide transmutation reaction, and
compare the calculated extinction coefficient with the threshold and subject the structure to nuclide transmutation reaction when the extinction coefficient meets the threshold, and remove the surface layer when the extinction coefficient does not meet the threshold;
wherein the measurement means is a spectroscopic ellipsometer.

5. The evaluation device for a structure to be used for nuclide transmutation reaction according to claim 4, wherein the temperature holding means comprises:
a housing enclosing the structure support means to define a closed space in which the structure is accommodated;
a temperature measurement unit that measures the temperature of the structure; and
a temperature adjustment unit that adjusts the temperature of the structure.

6. A device for manufacturing a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal, wherein the measurement means comprises:
- the evaluation device according to claim 5 installed outside the housing;
- an exhaust means that is connected to the housing and evacuates the interior of the housing;
- target support means that is disposed in the housing and supports a target;
- a sputtering means that supports the target;
- a first optical window provided on a wall surface of the housing in such a way as to guide light emitted from the measurement means to the structure;
- a second optical window provided on a wall surface of the housing in such a way as to guide reflected light reflected from the structure to the outside of the housing;
- a first shutter member openably/closably installed inside the housing so as to correspond to the first optical window; and
- a second shutter member openably/closably installed inside the housing so as to correspond to the second optical window.

7. The evaluation device for a structure according to claim 4, wherein the threshold of the extinction coefficient at a light wavelength of 20 μm is set in a range not less than 17% and not greater than 48%.

8. A nuclide transmutation system comprising:
- a structure support means that supports a structure to be used for nuclide transmutation reaction, the structure including a base material containing at least one kind of metal selected from the group consisting of hydrogen storage metals and hydrogen storage alloys, an intermediate layer provided on the base material and stacked alternately with a first layer containing low work function substances relatively lower in work function than the metal and a second layer containing the metal, and a surface layer provided on the intermediate layer and containing the metal;
- a temperature holding means that holds the temperature of the structure at a predetermined temperature;
- a measurement means that measures a change in polarization between incident light and reflected light by irradiating the surface layer with light;
- a reactor in which the structure is disposed, and that carries out the nuclide transmutation reaction using the structure and electrodeposition on the structure from which the surface layer has been removed;
- an inert gas supply means that supplies an inert gas to the reactor;
- an exhaust means that exhausts an interior of the reactor;
- an electrodeposition solution supply unit that supplies an electrodeposition solution containing a nuclide transmutation substance and the metal to the reactor;
- a cleaning water supply unit that supplies cleaning water to the reactor; and
- an acid solution supply unit that supplies an acid solution to the reactor,
- wherein the system is configured to
- calculate an extinction coefficient based on the change in polarization of the structure measured by the measurement means,
- preliminarily set a threshold of the extinction coefficient based on a relationship between an extinction coefficient of a structure prepared in advance and a reaction yield obtained when the structure prepared in advance is subjected to the nuclide transmutation reaction, and
- compare the calculated extinction coefficient with the threshold and subject the structure to nuclide transmutation reaction when the extinction coefficient meets the threshold, and remove the surface layer when the extinction coefficient does not meet the threshold;
- wherein the measurement means is a spectroscopic ellipsometer.

* * * * *